United States Patent
Shimezawa et al.

(10) Patent No.: US 9,510,337 B2
(45) Date of Patent: Nov. 29, 2016

(54) BASE STATION APPARATUS, TERMINAL APPARATUS, COMMUNICATION METHOD, INTEGRATED CIRCUIT, AND COMMUNICATION SYSTEM

(71) Applicant: SHARP KABUSHIKI KAISHA, Osaka-shi, Osaka (JP)

(72) Inventors: Kazuyuki Shimezawa, Osaka (JO); Kimihiko Imamura, Osaka (JP); Toshizo Nogami, Osaka (JP); Daiichiro Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 14/385,008

(22) PCT Filed: Mar. 7, 2013

(86) PCT No.: PCT/JP2013/056227
§ 371 (c)(1),
(2) Date: Sep. 12, 2014

(87) PCT Pub. No.: WO2013/137091
PCT Pub. Date: Sep. 19, 2013

(65) Prior Publication Data
US 2015/0036615 A1  Feb. 5, 2015

(30) Foreign Application Priority Data
Mar. 15, 2012  (JP) .................................. 2012-058364

(51) Int. Cl.
*H04W 72/04*  (2009.01)
*H04L 5/00*  (2006.01)
(Continued)

(52) U.S. Cl.
CPC .......... *H04W 72/042* (2013.01); *H04L 5/0051* (2013.01); *H04L 5/0053* (2013.01); *H04W 72/00* (2013.01); *H04W 88/08* (2013.01)

(58) Field of Classification Search
CPC . H04W 72/042; H04W 72/00; H04W 88/08; H04L 5/0053; H04L 5/0051
See application file for complete search history.

(56) References Cited

U.S. PATENT DOCUMENTS 9,054,843 B2 * 6/2015 Frederiksen ........ H04W 72/042
2011/0044391 A1  2/2011 Ji et al.
(Continued)

FOREIGN PATENT DOCUMENTS

JP  2012-004609 A  1/2012
WO  WO 2010/053984 A2  5/2010

OTHER PUBLICATIONS

NTT Docomo, "Mapping Design for E-PDCCH in Rel-11," 3GPP TSG RAN WG1 Meeting #68, R1-120411, Dresden, Germany, Feb. 6-10, 2012, pp. 1/7-7/7.
(Continued)

*Primary Examiner* — Brian D Nguyen
(74) *Attorney, Agent, or Firm* — Birch, Stewart, Kolasch & Birch, LLP

(57) ABSTRACT

A base station apparatus in the present invention includes a terminal-specific control channel generation unit that generates terminal-specific control channels mapped in a terminal-specific control channel region that is configured specifically to the terminal apparatus and that is constituted by a prescribed number of resource block pairs and transmitted. If a number of candidate specific control channels monitored by the terminal apparatus is smaller than or equal to a number of resource block pairs in the terminal-specific control channel region at each aggregation level, which indicates a number of the enhanced control channel elements used in each of the terminal-specific control channels, each of the candidate terminal-specific control channels corresponds to a different resource block pair in the terminal-specific control channel region. The terminal-specific control channels are mapped in one of the candidates.

As a result, in a radio communication system in which a base station and a terminal communicate with each other, the base station can efficiently transmit control information to the terminal, which is advantageous.

12 Claims, 11 Drawing Sheets

(51) Int. Cl.
*H04W 72/00* (2009.01)
*H04W 88/08* (2009.01)

(56) References Cited

U.S. PATENT DOCUMENTS

| | | | |
|---|---|---|---|
| 2011/0076962 | A1 | 3/2011 | Chen et al. |
| 2012/0054258 | A1* | 3/2012 | Li ............... H04W 72/0406 709/201 |
| 2013/0039284 | A1* | 2/2013 | Marinier ............ H04L 5/001 370/329 |
| 2013/0044664 | A1 | 2/2013 | Nory et al. |
| 2013/0044693 | A1* | 2/2013 | Lindh ............... H04L 5/0026 370/329 |
| 2013/0107861 | A1* | 5/2013 | Cheng ............. H04W 72/042 370/331 |
| 2013/0114517 | A1* | 5/2013 | Blankenship ...... H04L 5/0053 370/329 |
| 2013/0194931 | A1 | 8/2013 | Lee et al. |
| 2013/0195067 | A1* | 8/2013 | Khoshnevis ...... H04L 5/0094 370/330 |
| 2013/0215842 | A1 | 8/2013 | Han et al. |
| 2013/0242880 | A1* | 9/2013 | Miao .................. H04L 5/001 370/329 |
| 2013/0242882 | A1 | 9/2013 | Blankenship et al. |
| 2013/0301562 | A1 | 11/2013 | Liao et al. |
| 2014/0044070 | A1 | 2/2014 | Chen et al. |
| 2015/0036615 | A1 | 2/2015 | Shimezawa et al. |
| 2015/0063241 | A1 | 3/2015 | Shimezawa et al. |
| 2015/0296488 | A1 | 10/2015 | Shimezawa et al. |
| 2015/0358124 | A1 | 12/2015 | Suzuki et al. |

OTHER PUBLICATIONS

Sharp, "Partitioning of PRB pair and eCCE structure," 3GPP TSG RAN WG1 Meeting #68, R1-120281, Dresden, Germany, Feb. 6-10, 2012, pp. 1-8.
Huawei, HiSilicon, Investigation on downlink control channel and signalling enhancements [online], 3GPP TSG-RAN WG1 #66 R1-112049, Internet, URL: http://www.3gpp.org/ftp/tsg_ran/WG1_RL1/TSGR1_66/Docs/R1-112049.zip, Aug. 26, 2011 4 pp.
Panasonic, Multiplexing of ePDCCHs and ePDCCH RE mapping [online], 3GPP TSG-RAN WG1 #68 R1-120237, Internet, URL: http://www.3gpp.org/ftp/tsg_ran/WG1_RL1/TSGR1_68/Docs/R1-120237.zip, Feb. 10, 2012 4 pp.
Research in Motion, UK Limited, Search Space Design for E-PDCCH [online], 3GPP TSG-RAN WG1 #68 R1-120330, Internet, URL: http://www.3gpp.org/ftp/tsg_ran/WG1_RL1/TSGR1_68/Docs/R1-120330.zip, Feb. 10, 2012 6 pp.
NEC Group: "DCI Multiplexing for E-PDCCH", 3GPP Draft; R1-120257, 3GPP, vol. RAN WG1, No. Dresden, Germany; 20120206-20120210, Jan. 31, 2012, XP050562811, [retreived on Jan. 31, 2012].
Nokia et al: "Considerations on search spaces for E-PDCCH", 3GPP Draft; R1-120734, 3GPP, vol. RAN WG1, No. Dresden, Germany; 20120206-20120210, Jan. 31, 2012, XP050563116, [retrieved Jan. 31, 2012].
Qualcomm Incorporated: "Multiplexing of different DC1 messages for E-PDCCH", 3GPP Draft; R1-120562 Multiplexing of Different DCI Messages for E-PDCCH, 3GPP, vol. RAN WG1, No. Dresden, Germany; 20120206-20120210, (Jan. 31, 2012), XP050563000, [retrieved on Jan. 31, 2012].
Samsung: "Discussion on ePDCCH Design Issues", 3GPP Draft; R1-112517 EPDCCH, 3GPP, vol. RAN WG1, No. Athens, Greece; 20110822, (Aug. 16, 2011), XP050537597, [retreived on Aug. 16, 2011].
3GPP TR 36.819 V11.0.0 (Sep. 2011); 3rd Generation Partnership Project; Technical Specification Group Radio Access Network; Coordinated multi-point operation for LTE physical layer aspects (Release 11), pp. 1-68.
"Agenda Item 12.6 Source: Nortel Networks Doc For: Disc and Dec", 3GPP DR; R1-090153 (Nortel-CTRL and Data Channel Design for Relay Link), MOB Comp CTR; 650, Rte Des Lucioles; F-06921 S-A Cedex; FR, v. RAN WG1, No. Ljubljana, Slov; Jan. 12, 2009-Jan. 16, 2009, Jan. 8, 2009.
3GPP TR 36.814 V9.0.0, "3rd Generation Partnership Project; Technical Specification Group Radio Access Network; Further Advancements for E-UTRA Physical Layer Aspects (Release 9)", Mar. 2010; 9 pages.
3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)", Mar. 2011; 28 pages.
Chen et al., Advanced Wireless Communication System and Techniques, U.S. Appl. No. 61/471,042, filed Apr. 2011.
Ericsson et al; "Discussion on Un Starting Times", 3GPP Draft; R1-111332 Disc On Un Starting Times, 3rd Gen Partnership Project (3GPP), Mobile Comp CTR; 650 Rte Des Lucioles; F-06921 S-A Cedex; FR, vol. RAN WG1, No. Montreal, Canada; May 10, 2010, May 5, 2010.
Ericsson et al; "Enhancements for UE specific control signaling", 3GPP Draft; R1-111332 Enhancements for UE Specific Control SIG, 3GPP, Mobile Comp CTR; 650, Rte Des Lucioles; F-06921 S-A Cedex; FR, vol. RAN WG1, No, Barcelona, Spain; May 3, 2011, May 3, 2011.
Ericsson et al: "On multiplexing of DCI messages", 3GPP Draft; R1-120078, (3GPP), Mobile Competence Centre; 650, Route Des Lucioles; F-06921 Sophia-Antipous Cedex; FR, vol. RAN WG1, No. Dresden, Germany; Feb. 6, 2012-Feb. 10, 2012, Jan. 31, 2012, XP050562658, [retr Jan. 31, 2012].
Huaway: "Some Issues Concerning RN startup", 3GPP Draft; R2-102974, 3rd Gen Partnership Proj (3GPP), Mobile Comp CTR; 650, Rte Des Lucioles; F-06921 Sophia-Antipolis Cedex; FR, vol. Ran WG2, No. Montreal, Canada; May 10, 2010, May 1, 2010
International Search Report for Appln. No. PCT/JP2012/068825 mailed Oct. 30, 2012.
International Search Report for Appln. No. PCT/JP2012/068825 mailed Oct. 30, 2012.
LG Electronics, Concept of E-PDCCH CCE [online], 3GPP TSG-RAN WG1#68 R1-120454, Feb. 10, 2012, <URL:http://www.3gpp.org/ftp/tsg_ran/WG1_RL1/TSGR1_68/Docs/RI-120454.zip>.
NEC Group: "Supp freq div and freq sel. R-PDCCH trans", 3GPP DR; RI-103062 Supp FD and FS R-PDCCH Trans-V1C, (3GPP), Mobile Comp CTR; 650, Rte Des Lucioles; F-06921 S-A Cedex; FR, v. RAN WG1, No. Montreal, Canada; May 10, 2010, May 4, 2010, XP050420151.
Nokia et al: "Multiplexing of E-PDCCH for diff users", 3GPP Draft; RI-120735 Multiplexing E-PDCCH for Diff Users, (3GPP), Mobile Comp CTR; 650, Rte Des Lucioles; F-06921 S-A Cedex; FR, v. RAN WGI, No. Dresden, Ger; Feb. 6, 2012-Feb. 10, 2012, Jan. 31, 2012, P050563117.
Panasonic, 3GPP TSG RAN WG1 Meeting #64, "Resource Allocation Schemes of R-PDCCH", R1-110777, Taipei Taiwan, Feb. 21-25, 2011, pp. 1-7.
Panasonic: "R-PDCCH placement", 3GPP DR, RI-102042, 3GPP, Mobile Comp CTR; 650, Rte Des Lucioles; F-06921 S-A Cedex; France, vol. RAN WG1, No. Beijing, China; Apr. 12, 2010, Apr. 6, 2010, XP050419373.
Research in Motion, UK Limited: 'PDCCH Enhancement Considerations' 3GPP TSG-RAN WG1#65, RI-111661, May 13, 2011.
Samsung: "Multiplexing of Multiple E-PDCCHs for Distributed and Localized", 3GPP Draft; R1 120191, 3GPP, Mobile Comp CTR; 650, Rte Des Lucioles; F-06921 S-A Cedex; FR, V. RAN WG1, No. Dresden, Germany; Feb. 6, 2012-Feb. 10, 2012, Jan. 31, 2012, XP050562756, [retr Jan. 31, 2012].
U.S. Final Office Action for U.S. Appl. No. 14/235,581 mailed Apr. 8, 2016.
U.S. Office Action for U.S. Appl. No. 14/235,581 mailed Jan. 14, 2015.
U.S. Office Action for U.S. Appl. No. 14/235,581 mailed Sep. 11, 2015.
U.S. Office Action for U.S. Appl. No. 14/385,408 mailed Nov. 20, 2015.

* cited by examiner

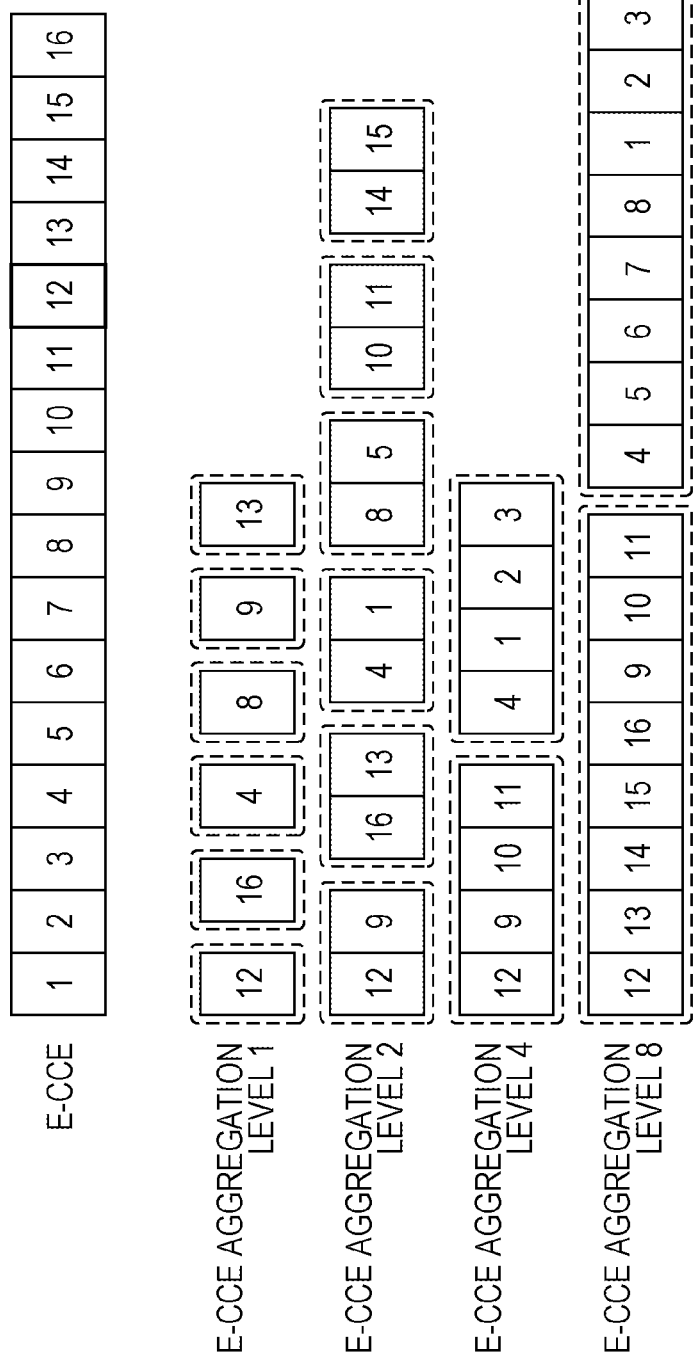

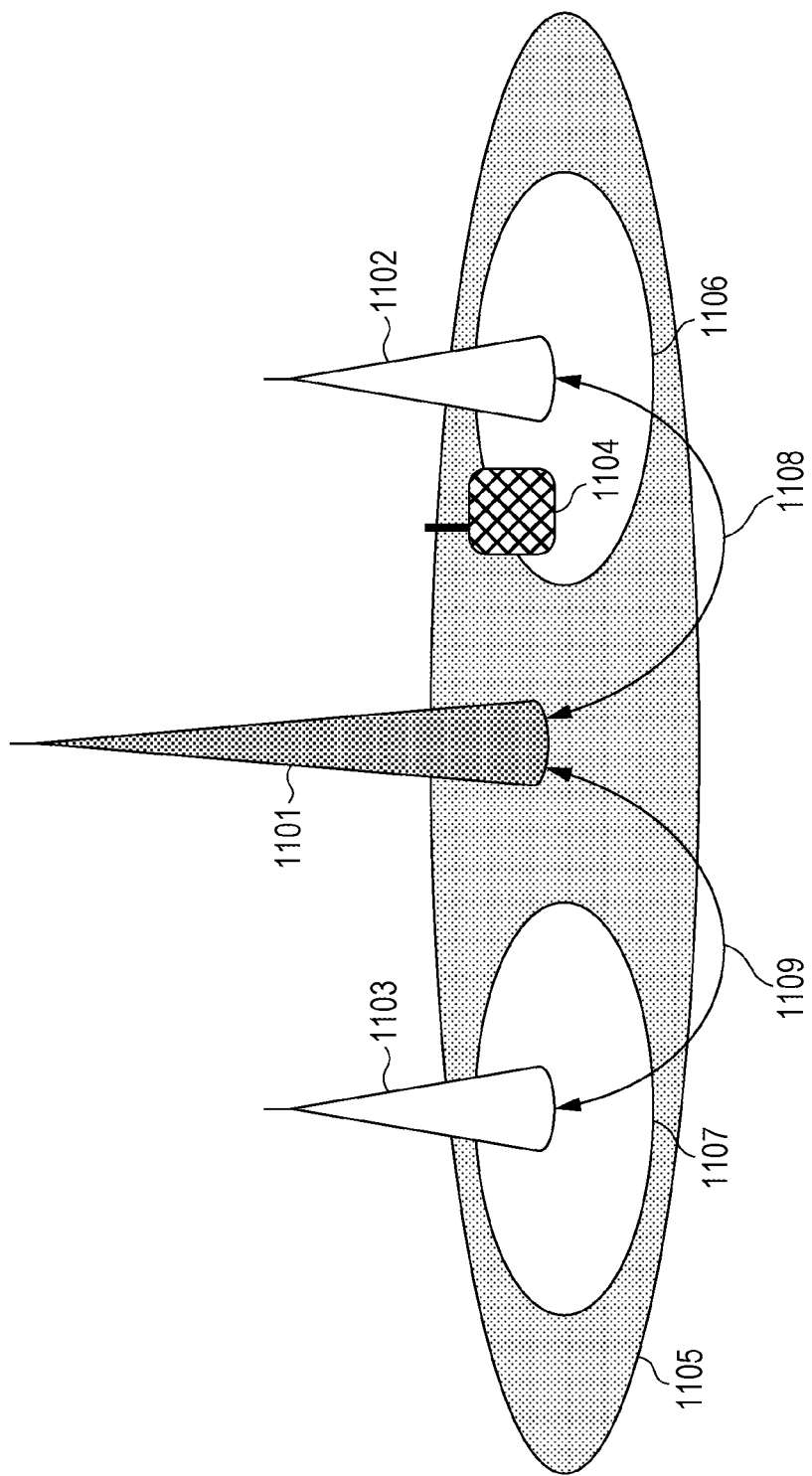

BASE STATION APPARATUS, TERMINAL APPARATUS, COMMUNICATION METHOD, INTEGRATED CIRCUIT, AND COMMUNICATION SYSTEM

TECHNICAL FIELD

The present invention relates to a base station apparatus, a terminal apparatus, a communication method, an integrated circuit, and a communication system.

BACKGROUND ART

In a radio communication system such as WCDMA (Wideband Code Division Multiple Access), LTE (Long-Term Evolution), or LTE-A (LTE-Advanced) developed by the 3GPP (Third Generation Partnership Project) or wireless LAN or WiMAX (Worldwide Interoperability for Microwave Access) developed by the IEEE (Institute of Electrical and Electronics Engineers), a base station (a cell, a transmission station, a transmission apparatus, or an eNodeB) and a terminal (a mobile terminal, a reception station, a mobile station, a reception apparatus, or UE (user equipment)) each include a plurality of transmission and reception antennas and realize high-speed data communication by spatially multiplexing data signals using a MIMO (multi-input multi-output) technique.

When the base station transmits downlink data (transport blocks of downlink shared channels (DL-SCHs)) to the terminal in such a radio communication system, the base station multiplexes and transmits demodulation reference signals (DMRSs), which are signals known between the base station and the terminal. Here, the demodulation reference signals are also referred to as user equipment-specific reference signals (UE-specific RSs or terminal-specific (unique) RSs). The demodulation reference signals will also be referred to simply as reference signals hereinafter.

For example, the reference signals are multiplexed with the downlink data before a precoding process is applied. Therefore, the terminal can measure equalization channels including the applied precoding process and a channel state using the reference signals. That is, the terminal can demodulate the downlink data without the base station transmitting the applied precoding process.

Here, the downlink data is mapped in physical downlink shared channels (PDSCHs). That is, the reference signals are used for demodulating the PDSCHs. In addition, for example, the reference signals are transmitted only in resource blocks (also referred to as physical resource blocks or resources) in which the corresponding PDSCHs are mapped.

Here, a radio communication system has been examined that uses heterogeneous network deployment (HetNet) that includes a macro base station having wide coverage and an RRH (remote radio head) having narrower coverage than the macro base station. FIG. 11 is a schematic diagram illustrating a radio communication system that uses the heterogeneous network deployment. As illustrated in FIG. 11, for example, a heterogeneous network is constituted by a macro base station 1101, an RRH 1102, and an RRH 1103.

In FIG. 11, the macro base station 1101 constructs coverage 1105, and the RRH 1102 and the RRH 1103 construct coverage 1106 and coverage 1107, respectively. In addition, the macro base station 1101 is connected to the RRH 1102 through a line 1108 and to the RRH 1103 through a line 1109. As a result, the macro base station 1101 can transmit and receive data signals and control signals (control information) to and from the RRH 1102 and the RRH 1103. Here, as the line 1108 and the line 1109, for example, wired lines such as optical fibers or wireless lines that use a relay technique are used. At this time, when part or all of the macro base station 1101, the RRH 1102, and the RRH 1103 use the same resources, total spectral efficiency (transmission capacity) in an area of the coverage 1105 can be improved.

In addition, when a terminal 1104 is located inside the coverage 1106, the terminal 1104 can perform single-cell communication with the RRH 1102. On the other hand, when the terminal 1104 is located around an edge (cell edge) of the coverage 1106, measures against interference of the same channels from the macro base station 1101 need to be taken. Here, a method for reducing or suppressing interference with the terminal 1104 around the cell edge region has been examined in which base station cooperative communication, in which neighboring base stations cooperate with each other, is performed as multi-cell communication (cooperative communication) between the macro base station 1101 and the RRH 1102. For example, as a scheme for reducing or suppressing interference by the base station cooperative communication, a CoMP (cooperative multi-point) transmission scheme has been examined (NPL 1).

CITATION LIST

Non Patent Literature

NPL 1: 3rd Generation Partnership Project; Technical Specification Group Radio Access Network; Coordinated multipoint operation for LTE physical layer aspects (Release 11), September 2011, 3GPP TR 36.819 V11.0.0 (2011-09)

SUMMARY OF INVENTION

Technical Problem

When an existing method is used as a method for transmitting control information from a base station to a terminal in the heterogeneous network deployment, the CoMP transmission scheme, and/or the like, however, a problem of the capacity of a transmission region of the control information arises. As a result, the control information cannot be efficiently transmitted from the base station to the terminal, which can prevent improvement of the transmission efficiency in the communication between the base station and the terminal.

The present invention has been established in view of the above problem, and an object thereof is to provide, in a communication system in which a base station and a terminal communicate with each other, a base station apparatus, a terminal apparatus, a communication method, an integrated circuit, and a communication system capable of efficiently transmitting control information from the base station to the terminal.

Solution to Problem (1) The present invention has been established in order to solve the above-described problem. A base station apparatus according to an aspect of the present invention is a base station apparatus that is configured to communicate with a terminal apparatus using resource block pairs, each of which is constituted by a prescribed time domain and a prescribed frequency domain. The base station apparatus includes a terminal-specific control channel generation unit configured to generate a terminal-specific control channel mapped in a terminal-specific control channel region that is configured specifically to the terminal apparatus and that is constituted by a prescribed number of the resource block pairs and transmitted. The terminal-specific control channel is constituted by one or more enhanced control channel elements, and each of the enhanced control channel elements is constituted by only a plurality of enhanced resource element groups in one of the resource block pairs. If the number of terminal-specific control channel candidates monitored by the terminal apparatus is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The terminal-specific control channel is mapped in one of the candidates.

(2) In addition, an aspect of the present invention is the above base station apparatus. In the terminal-specific control channels, all the enhanced channel elements are included in one of the resource block pairs.

(3) In addition, a terminal apparatus according to an aspect of the present invention is a terminal apparatus that is configured to communicate with a base station apparatus using resource block pairs, each of which is constituted by a prescribed time domain and a prescribed frequency domain. The terminal apparatus includes a control channel processing unit configured to monitor a plurality of terminal-specific control channel candidates in a terminal-specific control channel region that is configured specifically to the terminal apparatus and that is constituted by a prescribed number of the resource block pairs. The terminal-specific control channel is constituted by one or more enhanced control channel elements, and each of the enhanced control channel elements is constituted by only a plurality of enhanced resource element groups in one of the resource block pairs. If the number of terminal-specific control channel candidates is smaller than or equal to the number of resource block pairs in the terminal-specific control channel region at each aggregation level, which indicates the number of the enhanced control channel elements used in the terminal-specific control channel, each of the terminal-specific control channel candidates corresponds to a different resource block pair in the terminal-specific control channel region. The control channel processing unit monitors the candidate.

(4) In addition, a terminal apparatus according to an aspect of the present invention is the above terminal apparatus. In the terminal-specific control channel, all the enhanced channel elements are included in one of the resource block pairs.

(5) In addition, a communication method according to an aspect of the present invention used by a base station apparatus that is configured to communicate with a terminal apparatus using resource block pairs, each of which is constituted by a prescribed time domain and a prescribed frequency domain, includes a step of generating a terminal-specific control channel mapped in a terminal-specific control channel region that is configured specifically to the terminal apparatus and that is constituted by a prescribed number of the resource block pairs and transmitted. The terminal-specific control channel is constituted by one or more enhanced control channel elements, and each of the enhanced control channel elements is constituted by only a plurality of enhanced resource element groups in one of the resource block pairs. If the number of terminal-specific control channel candidates monitored by the terminal apparatus is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The communication method includes a step of mapping the terminal-specific control channel in one of the candidates.

(6) In addition, a communication method according to an aspect of the present invention used by a base station apparatus that communicates with a terminal apparatus is the above communication method. In the terminal-specific control channel, all the enhanced channel elements are included in one of the resource block pairs.

(7) In addition, a communication method according to an aspect of the present invention used by a terminal apparatus that is configured to communicate with a base station apparatus using resource block pairs, each of which is constituted by a prescribed time domain and a prescribed frequency domain, includes a step of monitoring a plurality of terminal-specific control channel candidates in a terminal-specific control channel region that is configured specifically to the terminal apparatus and that is constituted by a prescribed number of the resource block pairs. The terminal-specific control channel is constituted by one or more enhanced control channel elements, and each of the enhanced control channel elements is constituted by only a plurality of enhanced resource element groups in one of the resource block pairs. If the number of terminal-specific control channel candidates is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The control channel processing unit includes a step of monitoring the candidates.

(8) In addition, a communication method according to an aspect of the present invention used by a terminal apparatus that communicates with a base station apparatus is the above communication method. In the terminal-specific control channel, all the enhanced channel elements are included in one of the resource block pairs.

(9) In addition, an integrated circuit according to an aspect of the present invention used in a base station apparatus that is configured to communicate with a terminal apparatus using resource block pairs, each of which is constituted by a prescribed time domain and a prescribed frequency domain, includes a function of generating a terminal-specific control channel mapped in a terminal-specific control channel region that is configured specifically to the terminal apparatus and that is constituted by a prescribed number of the resource block pairs and transmitted. The terminal-specific control channel is constituted by one or more enhanced control channel elements, and each of the enhanced control channel elements is constituted by only a plurality of enhanced resource element groups in one of the resource block pairs. If the number of terminal-specific control channel candidates monitored by the terminal apparatus is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The integrated circuit includes a function of mapping the terminal-specific control channel in one of the candidates.

(10) In addition, an integrated circuit according to an aspect of the present invention used in a base station apparatus that communicates with a terminal apparatus is the above integrated circuit. In the terminal-specific control channel, all the enhanced channel elements are included in one of the resource block pairs.

(11) In addition, an integrated circuit according to an aspect of the present invention used in a terminal apparatus that is configured to communicate with a base station apparatus using resource block pairs, each of which is constituted by a prescribed time domain and a prescribed frequency domain, includes a function of monitoring a plurality of terminal-specific control channel candidates in a terminal-specific control channel region that is configured specifically to the terminal apparatus and that is constituted by a prescribed number of the resource block pairs. The terminal-specific control channel is constituted by the one or more enhanced control channel elements, and each of the enhanced control channel elements is constituted by only a plurality of enhanced resource element groups in one of the resource block pairs. If the number of terminal-specific control channel candidates is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The control channel processing unit includes a function of monitoring the candidates.

(12) In addition, an integrated circuit according to an aspect of the present invention used in a terminal apparatus that communicates with a base station apparatus is the integrated circuit. In the terminal-specific control channel, all the enhanced channel elements are included in one of the resource block pairs.

(13) In addition, a communication system according to an aspect of the present invention in which a base station apparatus and a terminal apparatus communicate with each other is a communication system in which a base station apparatus and a terminal apparatus communicate with each other using resource block pairs, each of which is constituted by a prescribed time domain and a prescribed frequency domain. The base station apparatus comprises a terminal-specific control channel generation unit configured to generate a terminal-specific control channel mapped in a terminal-specific control channel region that is configured specifically to the terminal apparatus and that is constituted by a prescribed number of the resource block pairs and transmitted. The terminal apparatus comprises a control channel processing unit configured to monitor a plurality of terminal-specific control channel candidates in the terminal-specific control channel region. The terminal-specific control channel is constituted by one or more enhanced control channel elements, and each of the enhanced control channel elements is constituted by only a plurality of enhanced resource element groups in one of the resource block pairs. If the number of terminal-specific control channel candidates is smaller than or equal to the number of resource block pairs in the terminal-specific control channel region at each aggregation level which indicates the number of the enhanced control channel elements used in the terminal-specific control channel, each of the terminal-specific control channel candidates corresponds to a different resource block pair in the terminal-specific control channel region. The base station apparatus maps the terminal-specific control channel in one of the candidates. The control channel processing unit in the terminal apparatus monitors the candidates.

(14) In addition, a communication system according to an aspect of the present invention in which a base station apparatus and a terminal apparatus communicate with each other is the above communication system. In the terminal-specific control channel, all the enhanced channel elements are included in one of the resource block pairs.

Advantageous Effects of Invention

According to the present invention, in a radio communication system in which a base station and a terminal communicate with each other, the base station can efficiently transmit control information to the terminal.

BRIEF DESCRIPTION OF DRAWINGS

FIG. 10 is a diagram illustrating an example of the SS of the terminal 200 for searching for the second control channel.

FIG. 11 is a schematic diagram illustrating a radio communication system that uses heterogeneous network deployment.

DESCRIPTION OF EMBODIMENTS

First Embodiment

Figure 1:
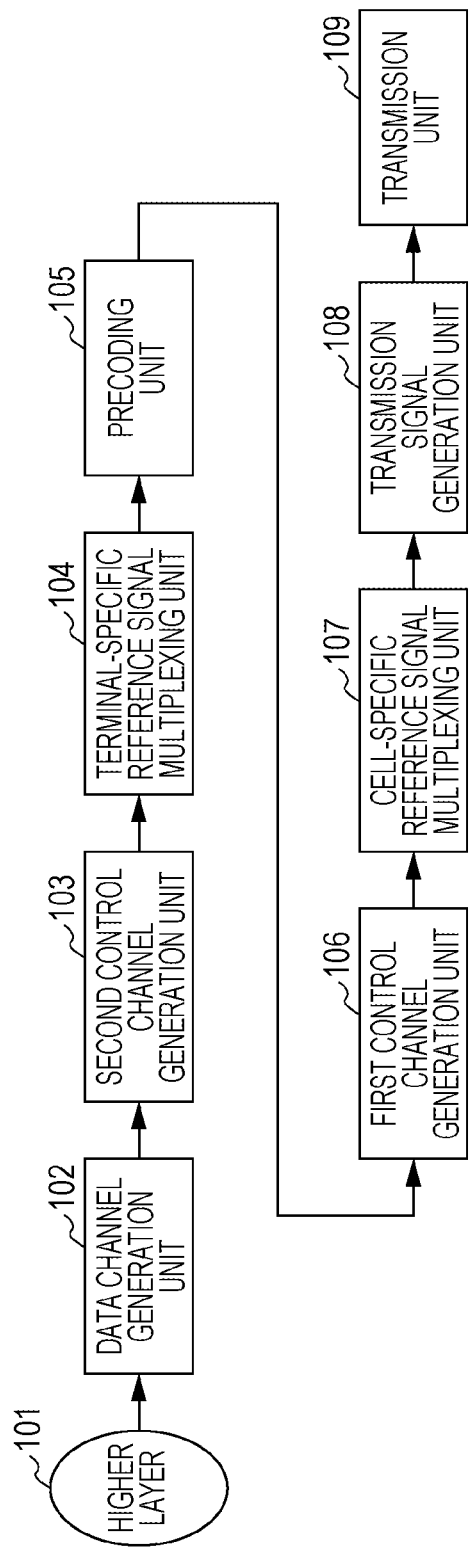
FIG. 1 is a schematic block diagram illustrating the structure of a base station 100 according to a first embodiment of the present invention.

A first embodiment of the present invention will be described hereinafter. A communication system according to the first embodiment includes a base station (a transmission apparatus, a cell, a transmission point, transmission antennas, transmission antenna ports, a component carrier, or an eNodeB) and a terminal (a terminal apparatus, a mobile terminal, a reception point, a reception terminal, a reception apparatus, reception antennas, reception antenna ports, or UE).

In the communication system in the present invention, a base station 100 transmits control information and information data through a downlink in order to perform data communication with a terminal 200.

Here, the control information is subjected to an error detection coding process and the like and mapped in control channels. The control channels (PDCCHs; physical downlink control channels) are each subjected to an error correction coding process and a modulation process and transmitted and received through a first control channel (first physical control channel) region or a second control channel (second physical control channel) region, which is different from the first control channel region. However, the physical control channels herein are types of physical channels, and are control channels defined in physical frames. In addition, in the following description, control channels mapped in the first control channel region will also be referred to as first control channels, and a control channel mapped in the second control channel region will also be referred to as a second control channel. In addition, the first control channels will also be referred to as PDCCHs, and the second control channel will also be referred to as an E-PDCCH (enhanced PDCCH).

It is to be noted that from a prescribed perspective, the first control channels are physical control channels that use the same transmission port (antenna port) as cell-specific reference signals. On the other hand, the second control channel is a physical control channel that uses the same transmission port as terminal-specific reference signals. The terminal 200 demodulates the first control channels using the cell-specific reference signals and the second control channel using the terminal-specific reference signals. The cell-specific reference signals are signals that are common to all terminals in a cell and that can be used by any terminal because the cell-specific reference signals are inserted into almost all resources. Therefore, the first control channels can be demodulated by any terminal. On the other hand, the terminal-specific reference signals are reference signals inserted only into assigned resources and, as with the data, can be adaptively subjected to a precoding process and a beamforming process. The control channel arranged in the second control channel region in this case can obtain gain of the adaptive precoding and beamforming and frequency scheduling gain. In addition, the terminal-specific reference signals can be shared by a plurality of terminals. For example, if the control channel arranged in the second control channel region is distributed among a plurality of resources (for example, resource blocks) and transmitted, the terminal-specific reference signals in the second control channel region can be shared by a plurality of terminals. The control channel arranged in the second control channel region in this case can obtain frequency diversity gain.

In addition, from another perspective, the control channels (first control channels) mapped in the first control channel region are physical control channels in OFDM symbols (symbols) located at a top of physical subframes and can be arranged over the entirety of the system bandwidth (component carrier (CC)) of these OFDM symbols. In addition, the control channel (second control channel) mapped in the second control channel region is a physical control channel in OFDM symbols located after the first control channels in the physical subframes and can be arranged in part of the system bandwidth of these OFDM symbols. Since the first control channels are arranged in the OFDM symbols dedicated to the control channels located at the top of the physical subframes, the first control channels can be received and demodulated prior to rear OFDM symbols for physical data channels. In addition, a terminal that monitors only the OFDM symbols dedicated to the control channels can also receive the first control channels. In addition, since the first control channels are distributed over the entirety of the CC, inter-cell interference can be randomized. In addition, the first control channel region is a region configured specifically to the base station 100 and is a region common to all terminals connected to the base station 100. On the other hand, the second control channel is arranged in the rear OFDM symbols for shared channels (physical data channels), which are normally received by a communicating terminal. In addition, by performing frequency-division multiplexing, the second control channel can be orthogonally multiplexed (multiplexing without interference) with one another or the second control channel and the physical data channels can be orthogonally multiplexed. In addition, the second control channel region is a region configured specifically to the terminal 200 and is a region configured for each terminal connected to the base station 100. It is to be noted that the base station 100 can configure the second control channel region to be shared by a plurality of terminals. In addition, the first control channel region and the second control channel region are arranged in the same physical subframes. Here, the OFDM symbols are units in a time direction in which bits of the channels are mapped.

In addition, from another perspective, the first control channels are cell-specific physical control channels and physical channels that can be obtained (detected) by both terminals in an idle state and terminals in a connected state. On the other hand, the second control channel is a terminal-specific physical control channel and a physical channel that can be obtained by only terminals in the connected state. Here, the idle state refers to a state in which data is not immediately transmitted or received, such as a state (RRC_IDLE state) in which a base station is not accumulating RRC (radio resource control) information or a state in which a mobile station is performing discontinuous reception (DRX). On the other hand, the connected state refers to a state in which data can be immediately transmitted or received, such as a state (RRC CONNECTED state) in which a terminal holds information regarding a network or a state in which a mobile station is not performing the discontinuous reception (DRX). The first control channels are channels that can be received by a terminal independently of terminal-specific RRC signaling. The second control channel is a channel that can be constituted by the terminal-specific RRC signaling and a channel received by a terminal through the terminal-specific RRC signaling. That is, the first control channels are channels that can be received by any terminal in accordance with configurations restricted in advance, and the second control channel is a channel for which terminal-specific configurations can be easily changed.

FIG. 1 is a schematic block diagram illustrating the structure of the base station 100 according to the first embodiment of the present invention. In FIG. 1, the base station 100 includes a higher layer 101, a data channel generation unit 102, a second control channel generation unit 103, a terminal-specific reference signal multiplexing unit 104, a precoding unit 105, a first control channel generation unit 106, a cell-specific reference signal multiplexing unit 107, a transmission signal generation unit 108, and a transmission unit 109.

The higher layer 101 generates information data (transport blocks and codewords) intended for the terminal 200 and outputs the information data to the data channel generation unit 102. Here, the information data may be units for performing the error correction coding process. In addition, the information data may be units for performing retransmission control such as HARQ (hybrid automatic repeat request). In addition, the base station 100 can transmit a plurality of pieces of information data to the terminal 200.

The data channel generation unit (data channel region assignment unit, data channel mapping unit, or shared channel generation unit) 102 performs adaptive control on the information data output from the higher layer 101 to generate data channels (shared channels, common channels, or PDSCHs; physical downlink shared channels) intended for the terminal 200. More specifically, in the adaptive control performed by the data channel generation unit 102, a coding process for performing the error correction coding, a scrambling process for providing scrambling codes specific to the terminal 200, a modulation process for using a multilevel modulation scheme, a layer mapping process for performing spatial multiplexing such as MIMO, and the like are performed. Here, in the layer mapping process performed by the data channel generation unit 102, mapping is performed in one or more layers (streams) on the basis of the number of ranks configured for the terminal 200.

The second control channel generation unit (second control channel region assignment unit, second control channel mapping unit, or terminal-specific control channel generation unit) 103 generates a control channel transmitted through the second control channel region when the base station 100 transmits control information intended for the terminal 200 through the second control channel region (terminal-specific control channel region). Here, if the second control channel region is configured in a shared channel region, the data channel generation unit 102 and the second control channel generation unit 103 are also referred to as shared channel region assignment units. It is to be noted that the data channels and/or the second control channel is also referred to as a shared channel. In addition, the second control channel is also referred to as an E-PDCCH (enhanced PDCCH) or a terminal-specific control channel.

The terminal-specific reference signal multiplexing unit (terminal-specific reference signal generation unit, terminal-specific control channel demodulation reference signal multiplexing unit, or terminal-specific control channel demodulation reference signal generation unit) 104 generates terminal-specific reference signals (data channel demodulation reference signals, second control channel demodulation reference signals, shared channel demodulation reference signals, terminal-specific control channel demodulation reference signals, DM-RSs (demodulation reference signals), DRSs (dedicated reference signals), precoded RSs, or UE-specific RSs) specific to the terminal 200 and multiplexes the terminal-specific reference signals in the shared channel region. In addition, an initial value for generating scrambling codes constituting the terminal-specific reference signals is input to the terminal-specific reference signal multiplexing unit 104. The terminal-specific reference signal multiplexing unit 104 generates the terminal-specific reference signals on the basis of the input initial value of the scrambling codes. Here, the terminal-specific reference signals are configured on the basis of data channels or a second control channel with which the terminal-specific reference signals are multiplexed, and multiplexed in each layer (antenna port) of the data channels or the second control channel. It is to be noted that the terminal-specific reference signals are preferably orthogonal and/or quasi-orthogonal between the layers. It is to be noted that the terminal-specific reference signal multiplexing unit 104 may generate the terminal-specific reference signals, and the generated terminal-specific reference signals may be multiplexed by the transmission signal generation unit 108, which will be described later.

The precoding unit 105 performs a precoding process on the data channels, the second control channel, and/or the terminal-specific reference signals output from the terminal-specific reference signal multiplexing unit 104. Here, the precoding process may be different depending on whether the terminal-specific reference signals are shared by a plurality of terminals or used by only one terminal. If the precoding process is used by the terminal 200, it is preferable to perform phase rotation, amplitude control, and/or the like on the input signals in the precoding process in order for the terminal 200 to efficiently receive the signals. For example, the precoding process is preferably performed in such a way as to maximize the reception power of the terminal 200, reduce interference from a neighboring cell, or reduce interference to the neighboring cell. In addition, a process that uses a predetermined precoding matrix, CDD (cyclic delay diversity), or transmission diversity (SFBC (spatial frequency block code), STBC (spatial time block code), TSTD (time switched transmission diversity), FSTD (frequency-switched transmission diversity), or the like) may be used, but the process performed is not limited to these. In addition, if the terminal-specific reference signals are shared by a plurality of terminals, the process that uses a predetermined precoding matrix, the CDD, or the transmission diversity is preferably used in the precoding process. Here, if the terminal 200 feeds a plurality of types of PMIs (precoding matrix indicators), which are feedback information regarding the precoding process, back to the base station 100, the base station 100 can perform the precoding process for the terminal 200 on the basis of results obtained by calculating, that is, for example, multiplying, the plurality of PMIs.

Here, the terminal-specific reference signals are signals known to both the base station 100 and the terminal 200. Here, if the precoding unit 105 performs a precoding process specific to the terminal 200, the terminal-specific reference signals can estimate a downlink channel state between the base station 100 and the terminal 200 and equalization channels of precoding weighting provided by the precoding unit 105 when the terminal 200 demodulates the data channels and/or the second control channel. That is, the signals subjected to the precoding process can be demodulated without the base station 100 transmitting the precoding weighting provided by the precoding unit 105 to the terminal 200.

The first control channel generation unit (first control channel region assignment unit, first control channel mapping unit, or cell-specific control channel generation unit) 106 generates control channels transmitted through the first control channel region when the base station 100 transmits control information intended for the terminal 200 through the first control channel region (cell-specific control channel region). Here, the control channels transmitted through the first control channel region are also referred to as first control channels. In addition, the first control channels are also referred to as cell-specific control channels.

The cell-specific reference signal multiplexing unit (cell-specific reference signal generation unit) 107 generates cell-specific reference signals (channel state information reference signals, CRSs (common RSs), cell-specific RSs, non-precoded RSs, cell-specific control channel demodulation reference signals, and first control channel demodulation reference signals) known to both the base station 100 and the terminal 200, in order to measure the downlink channel state between the base station 100 and the terminal 200. The generated cell-specific reference signals are multiplexed with the signals output from the first control channel generation unit 106. It is to be noted that the cell-specific reference signal multiplexing unit 107 may generate the cell-specific reference signals, and the generated cell-specific reference signals may be multiplexed by the transmission signal generation unit 108, which will be described later.

Here, the cell-specific reference signals may be any signals (sequences) insofar as the signals are known to both the base station 100 and the terminal 200. For example, random numbers or pseudo-noise sequences based on a parameter assigned to the base station 100 in advance such as a number (cell ID) specific to the base station 100 may be used. In addition, as a method for establishing orthogonality between antenna ports, a method for making resource elements in which the cell-specific reference signals are mapped null (zero) between the antenna ports, a method in which code-division multiplexing is performed using the pseudo-noise sequences, a method obtained by combining the foregoing methods, or the like may be used. It is to be noted that the cell-specific reference signals need not be multiplexed in all subframes, but may be multiplexed in part of the subframes.

In addition, the cell-specific reference signals are reference signals that are multiplexed after the precoding process performed by the precoding unit 105. Therefore, the terminal 200 can measure the downlink channel state between the base station 100 and the terminal 200 using the cell-specific reference signals and demodulate signals that have not been subjected to the precoding process performed by the precoding unit 105. For example, the first control channels may be subjected to a demodulation processes using the cell-specific reference signals. The first control channels may be subjected to the demodulation process using the CRSs.

The transmission signal generation unit (channel mapping unit) 108 performs a process for mapping the signals output from the cell-specific reference signal multiplexing unit 107 in resource elements of each antenna port. More specifically, the transmission signal generation unit 108 maps the data channels in data channel region of the shared channel region and the second control channel of the shared channel region. Furthermore, the transmission signal generation unit 108 maps the first control channels in the first control channel region, which is different from the second control channel region. Here, the base station 100 can map control channels intended for a plurality of terminals in the first control channel region and/or the second control channel region. It is to be noted that the base station 100 may map the data channels in the second control channel region, instead. For example, if the second control channel is not mapped in the second control channel region constituted by the base station 100 for the terminal 200, the data channels may be mapped in the second control channel region.

Here, the first control channels and the second control channel are control channels transmitted through different resources, control channels subjected to the demodulation process using different reference signals, and/or control channels that can be transmitted in accordance with different RRS states of the terminal 200. In addition, control information of any format may be mapped in these control channels. It is to be noted that the format of control information that can be mapped may be defined for each of control channels. For example, control information of any format can be mapped in the first control channels, and control information of a prescribed format can be mapped in the second control channel. For example, control information of any format can be mapped in the first control channels, and control information of a format including assignment information regarding data channels that use the terminal-specific reference signals can be mapped in the second control channel.

Here, the PDCCHs are used for transmitting (specifying) downlink control information (DCI) to the terminal. For example, the downlink control information includes information regarding resource assignment of the PDSCHs, information regarding an MCS (modulation and coding scheme), information regarding scrambling identity (also referred to as a scrambling identifier), information regarding reference signal sequence identity (also referred to as base sequence identity, a base sequence identifier, or a base sequence index), and the like.

In addition, a plurality of formats are defined for the downlink control information transmitted using the PDCCHs. Here, the formats of the downlink control information will be referred to as DCI formats. That is, fields corresponding to pieces of uplink control information are defined in the DCI formats.

For example, as downlink DCI formats, DCI Format 1 and DCI Format 1A used for scheduling a PDSCH (transmission of a PDSCH codeword and a downlink transport block) in a cell are defined. That is, DCI Format 1 and DCI Format 1A are used for transmitting a PDSCH using one transmission antenna port. In addition, DCI Format 1 and DCI Format 1A are also used for transmitting a PDSCH using transmission diversity (TxD) in which a plurality of transmission antenna ports are used.

In addition, as downlink DCI formats, DCI Format 2, DCI Format 2A, DCI Format 2B, and DCI Format 2C used for scheduling a PDSCH (transmission of up to two PDSCH codewords and up to two downlink transports) in a cell are defined. That is, DCI Format 2, DCI Format 2A, DCI Format 2B, and DCI Format 2C are used for transmitting a PDSCH in MIMO SDM (multiple-input multiple-output spatial domain multiplexing) in which a plurality of transmission antenna ports are used.

Here, the format of the control information is determined in advance. For example, the control information may be determined in accordance with an object of transmission from the base station 100 to the terminal 200. More specifically, the control information may be determined as assignment information regarding downlink data channels intended for the terminal 200, assignment information regarding uplink data channels (PUSCHs; physical uplink shared channels) or control channels (PUCCHs; physical uplink control channels) intended for the terminal 200, information for controlling the transmission power of the terminal 200, or the like. Therefore, for example, when the base station 100 transmits downlink information data to the terminal 200, the base station 100 transmits control channels in which control information including the assignment information regarding downlink data channels intended for the terminal 200 is mapped and data channels in which information data assigned on the basis of the control information is mapped. In addition, for example, when the base station 100 assigns uplink data channels intended for the terminal 200, the base station 100 transmits control channels in which control information including assignment information regarding uplink data channels intended for the terminal 200 is mapped. In addition, the base station 100 can transmit a plurality of different pieces of control information or the same control information to the same terminal 200 using different formats or the same format. It is to be noted that when the base station 100 transmits downlink information data to the terminal 200, the base station 100 can transmit downlink data channels using a subframe different from a subframe in which control channels are transmitted in which the control information including the assignment information regarding downlink data channels intended for the terminal 200 is mapped.

Here, since the first control channel region is a region specific to the base station 100, the first control region is also referred to as a cell-specific control channel region. In addition, since the second control channel region is a region specific to the terminal 200 constituted by the base station 100 through the RRC signaling, the second control channel region is also referred to as a terminal-specific control channel region. In addition, the second control channel region is configured using, as units, region in each of which two resource blocks constituted by a prescribed region in a frequency direction and a prescribed region in the time direction are continuously arranged in the time direction.

In addition, the base station 100 and the terminal 200 transmit and receive signals in higher layers. For example, the base station and the terminal transmit and receive radio resource control signals (also referred to as RRC signaling, RRC messages, RRC information) in an RRC layer (Layer 3). Here, dedicated signals transmitted from the base station to a prescribed terminal in the RRC layer are referred to as dedicated signals. That is, a configuration (information) transmitted by the base station using the dedicated signals is a configuration specific (unique) to the prescribed terminal.

In addition, the base station and the terminal transmit and receive MAC control elements in an MAC (mediam access control) layer (Layer 2). Here, the RRC signaling and/or the MAC control elements are also referred to as higher layer signals (higher layer signaling).

The transmission unit 109 performs an inverse fast Fourier transform (IFFT), adds guard intervals, and performs a process for converting into radio frequencies and the like, and then transmits the signals from one or a plurality of transmission antennas (transmission antenna ports).

Figure 2:
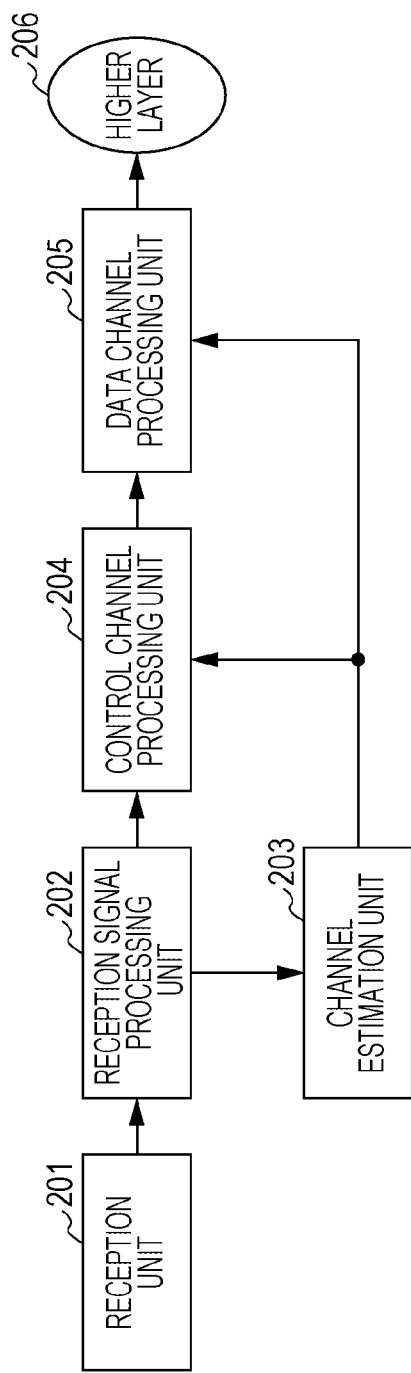
FIG. 2 is a schematic block diagram illustrating the structure of a terminal 200 according to the first embodiment of the present invention.

FIG. 2 is a schematic block diagram illustrating the configuration of the terminal 200 according to the first embodiment of the present invention. In FIG. 2, the terminal 200 includes a reception unit 201, a reception signal processing unit 202, a channel estimation unit 203, a control channel processing unit 204, a data channel processing unit 205, and a higher layer 206.

The reception unit 201 receives signals transmitted from the base station 100 using one or a plurality of reception antennas (reception antenna ports), performs a process for converting from the radio frequencies to baseband signals, removes the added guard intervals, and performs a time-frequency transform process realized by a fast Fourier transform (FFT) or the like.

The reception signal processing unit 202 demaps the signals mapped by the base station 100. More specifically, the reception signal processing unit 202 demaps (separates) the first control channels, the second control channel, and/or the data channels and outputs the demapped channels to the control channel processing unit 204. In addition, the reception signal processing unit 202 demaps the multiplexed cell-specific reference signals and/or terminal-specific reference signals and outputs the demapped signals to the channel estimation unit 203.

The channel estimation unit 203 performs channel estimation on the resources of the first control channels, the second control channel, and/or the data channels on the basis of the cell-specific reference signals and/or the terminal-specific reference signals. The channel estimation unit 203 outputs estimation results of the channel estimation to the control channel processing unit 204 and/or the data channel processing unit 205. The channel estimation unit 203 estimates (channel estimation) variation (frequency response and transmission function) in amplitude and phase in each resource element between each transmission antenna port and each reception antenna port on the basis of the terminal-specific reference signals multiplexed with the data channels and/or the second control channel and obtains a channel estimation value. Here, the initial value of the scrambling codes constituting the terminal-specific reference signals is input to the channel estimation unit 203, and the terminal-specific reference signals are determined on the basis of the initial value and the like. Alternatively, the channel estimation unit 203 estimates variation in amplitude and phase in each resource element between each transmission antenna port and each reception antenna port on the basis of the cell-specific reference signals multiplexed with the first control channels and obtains a channel estimation value.

The control channel processing unit 204 searches for the control channels intended for the terminal 200 mapped in the first control channel region and/or the second control channel region. Here, the control channel processing unit 204 configures the first control channel region and/or the second control channel region as control channel regions searched for the control channels. The configuration of the second control channel region is performed through the control information (for example, the RRC (radio resource control) signaling) from a higher layer transmitted from the base station 100 to the terminal 200. For example, the configuration of the second control channel region is control information for constituting the second control channel as terminal-specific configuration information regarding the second control channel and is control information specific to the base station 100. Details of the configuration of the second control channel region will be described later.

For example, when the base station 100 has transmitted the terminal-specific configuration information regarding the second control channel and configured the second control channel region, the control channel processing unit 204 searches for the control channels intended for the terminal 200 mapped in the second control channel region. In this case, the control channel processing unit 204 may further search part of the first control channel region. For example, the control channel processing unit 204 may further search a cell-specific search space in the first control channel region. In addition, when the base station 100 has not transmitted the terminal-specific configuration information regarding the second control channel and accordingly has not configured the second control channel region, the control channel processing unit 204 searches for the control channels intended for the terminal 200 mapped in the first control channel region.

Here, when the control channel processing unit 204 searches for the control channels intended for the terminal 200 mapped in the second control channel region, the control channel processing unit 204 uses the terminal-specific reference signals to demodulate the potential control channels. On the other hand, when the control channel processing unit 204 searches for the control channels intended for the terminal 200 mapped in the first control channel region, the control channel processing unit 204 uses the cell-specific reference signals to demodulate the potential control channels.

More specifically, the control channel processing unit 204 sequentially searches for all or part of control channel candidates obtained on the basis of the types of control information, the positions of resources in which the channels are mapped, the size of resources in which the channels are mapped, and the like by performing demodulation and decoding processes. The control channel processing unit 204 uses an error detection code (for example, a CRC (cyclic redundancy check) code) added to the control information as a method for determining whether the control information is intended for the terminal 200. In addition, such a search method is also referred to as blind decoding.

In addition, upon detecting the control channels intended for the terminal 200, the control channel processing unit 204 identifies control information mapped in the detected control channels, which are shared in the entirety of the terminal 200 (includes higher layers) and used in various types of control in the terminal 200, such as a process for receiving downlink data channels, a process for transmitting uplink data channels and control channels, and uplink transmission power control.

If control information including assignment information regarding downlink data channels is mapped in the detected control channels, the control channel processing unit 204 outputs the data channels demapped by the reception signal processing unit 202 to the data channel processing unit 205.

The data channel processing unit 205 performs, on the data channels input from the control channel processing unit 204, a channel compensation process (filtering process) in which the results of the channel estimation input from the channel estimation unit 203 are used, a layer demapping process, a demodulation process, a descrambling process, an error correction decoding process, and the like and outputs the processed data channels to the higher layer 206. It is to be noted that resource elements in which the terminal-specific reference signals are not mapped are, for example, interpolated or averaged in the frequency direction and the time direction on the basis of the resource elements in which the terminal-specific reference signals are mapped, and channel estimation is performed. In the channel compensation process, channel compensation is performed on the input data channels using the estimated channel estimation value in order to detect (restore) signals in each layer based on the information data. As a detection method, equalization in a ZF (zero forcing) criterion or an MMSE (minimum mean square error) criterion, turbo equalization, interference removal, or the like may be used. In the layer demapping process, the signals in each layer are subjected to a demapping process to obtain each piece of the information data. Subsequent processes are performed for each piece of the information data. In the demodulation process, demodulation is performed on the basis of the modulation scheme used. In the descrambling process, a descrambling process is performed on the basis of the scrambling codes used. In the decoding process, an error correction decoding process is performed on the basis of the coding method used.

Figure 3:
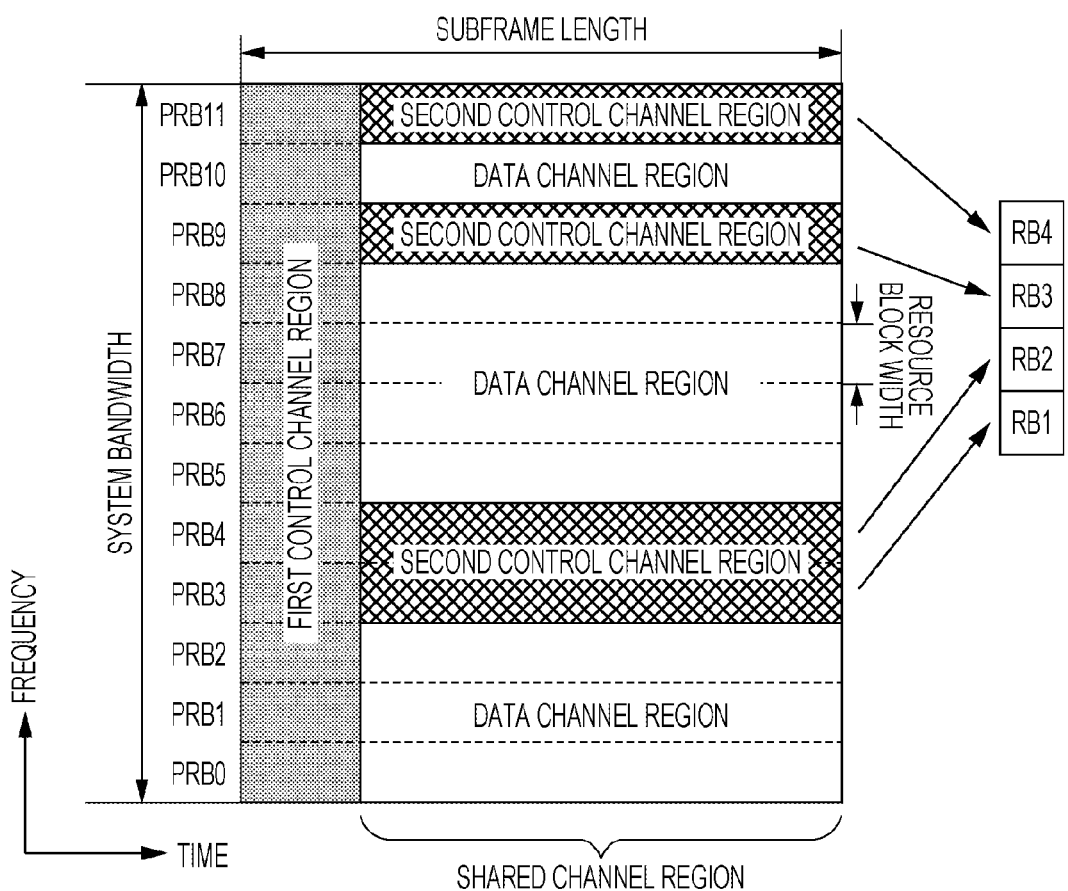
FIG. 3 is a diagram illustrating an example of subframes transmitted by the base station 100.

FIG. 3 is a diagram illustrating an example of a subframe transmitted by the base station 100. In this example, one subframe whose system bandwidth is constituted by twelve physical resource block pairs (PRBs) is illustrated. In addition, in the subframe, first zero or more OFDM symbols are the first control channel region. The number of OFDM symbols included in the first control channel region is transmitted to the terminal. For example, a dedicated transmission region may be configured in the first OFDM symbols, and the first control channel region can be dynamically transmitted for each subframe. Alternatively, the first control channel region can be semi-statically transmitted using control information from the higher layer. In addition, a region other than the first control channel region is a shared channel region. The shared channel region is constituted by including the data channel region and/or the second control channel region. In the example illustrated in FIG. 3, PRB3, PRB4, PRB9, and PRB11 are the second control channel region.

Here, the base station 100 transmits (configures) the second control channel region to the terminal 200 through the control information from the higher layer. For example, the control information for constituting the second control channel region is control information configured for each PRB or each group of PRBs. In the example illustrated in FIG. 3, PRB3, PRB4, PRB9, and PRB11 are configured as the second control channel region. In addition, the second control channel region is assigned in units of a prescribed number of PRBs. For example, the prescribed number of PRBs may be 4. In this case, the base station 100 configures a multiple of four of PRBs as the second control channel region.

Figure 4:
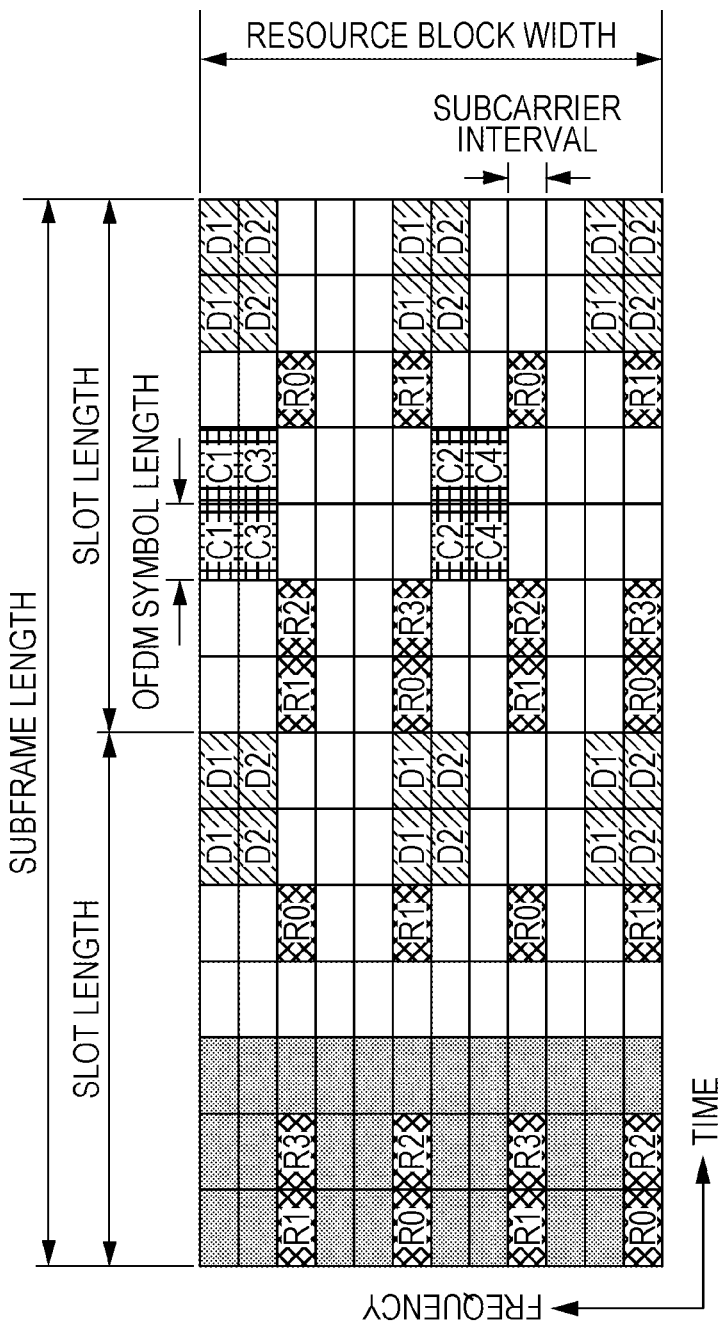
FIG. 4 is a diagram illustrating an example of a resource block pair in which the base station 100 performs mapping.

FIG. 4 is a diagram illustrating an example of one resource block pair mapped by the base station 100. One resource block is constituted by a prescribed region in the frequency direction and a prescribed region in the time direction, and one resource block pair is continuously arranged in the time direction. FIG. 4 illustrates two resource blocks (RBs), and each resource block is constituted by twelve subcarriers in the frequency direction and seven OFDM symbols in the time direction. In each OFDM symbol, each subcarrier is referred to as a resource element. Resource block pairs are arranged in the frequency direction, and the number of resource block pairs can be configured for each base station. For example, the number of resource block pairs may be 6 to 110. The width in the frequency direction at this time is referred to as a system bandwidth. In addition, the time direction of the resource block pairs is referred to as a subframe. In each subframe, seven continuous OFDM symbols in the time direction are referred to as a slot. In addition, in the following description, the resource block pairs will also be simply referred to as resource blocks.

Among hatched resource elements illustrated in FIG. 4, R0 to R3 indicate cell-specific reference signals for Antenna Ports 0 to 3, respectively. In the following description, the cell-specific reference signals for Antenna Ports 0 to 3 will also be referred to as CRSs (common reference signals). Here, the CRSs illustrated in FIG. 4 are ones in the case of four antenna ports, but the number of antenna ports may be changed, and, for example, CRSs for one antenna port or two antenna ports may be mapped.

In FIG. 4, as cell-specific reference signals different from the cell-specific reference signals for Antenna Ports 0 to 3, cell-specific reference signals for Antenna Ports 15 to 22 may be mapped. In the following description, the cell-specific reference signals for Antenna Ports 15 to 22 will also be referred to as channel state information reference signals. Among the hatched resource elements illustrated in FIG. 4, C1 to C4 indicate channel state information reference signals for CDM (code-division multiplexing) Groups 1 to 4, respectively. As the channel state information reference signals, first, orthogonal codes that use Walsh codes are mapped, and then scrambling codes that use Gold codes are superimposed. In addition, the channel state information reference signals are subjected to code-division multiplexing by the orthogonal codes such as the Walsh codes in the CDM groups. In addition, the channel state information reference signals are subjected to frequency-division multiplexing (FDM) between the CDM groups. In addition, the channel state information reference signals for Antenna Ports 15 and 16 are mapped in C1, the channel state information reference signals for Antenna Ports 17 and 18 are mapped in C2, the channel state information reference signals for Antenna Ports 19 and 20 are mapped in C3, and the channel state information reference signals for Antenna Ports 21 and 22 are mapped in C4. In addition, the channel state information reference signals may be configured as reference signals corresponding to the eight antenna ports, namely Antenna Ports 15 to 22. Alternatively, the channel state information reference signals may be configured as reference signals corresponding to the four antenna ports, namely Antenna Ports 15 to 18. Alternatively, the channel state information reference signals may be configured as reference signals corresponding to the two antenna ports, namely Antenna Ports 15 and 16. Alternatively, the channel state information reference signal may be configured as reference signals corresponding to the one antenna port, namely Antenna Port 15. In addition, the channel state information reference signals may be mapped in part of the subframes, that is, for example, the channel state information reference signals may be mapped in every plurality of subframes. In addition, resource elements in which the channel state information reference signals are arranged may be different from those illustrated in FIG. 4. In addition, a plurality of mapping patterns of the resource elements for the channel state information reference signals may be defined in advance. In addition, the base station 100 can configure a plurality of channel state information reference signals for the terminal 200. In addition, transmission power for the channel state information reference signals may be further configured, and, for example, the transmission power may be zero. The base station 100 configures the channel state information reference signals through the RRC signaling as terminal-specific control information regarding the terminal 200. The terminal 200 generates feedback information on the basis of the configuration provided by the base station 100 using the CRSs and/or the channel state information reference signals.

Among the hatched resource elements illustrated in FIG. 4, D1 and D2 indicate terminal-specific reference signals for CDM (code-division multiplexing) Groups 1 and 2, respectively. As the terminal-specific reference signals, first, orthogonal codes that use Walsh codes are mapped, and then scrambling codes that use Gold codes are superimposed. In addition, the terminal-specific reference signals are subjected to code-division multiplexing by the orthogonal codes such as the Walsh codes in the CDM groups. In addition, the terminal-specific reference signals are subjected to FDM between the CDM groups. Here, a maximum of eight ranks of terminal-specific reference signals may be mapped in accordance with control channels and data channels mapped in the corresponding resource block pair using eight antenna ports (Antenna Ports 7 to 14). In addition, the spreading code length of the CDM and the number of resource elements mapped may be changed in accordance with the number of ranks of terminal-specific reference signals mapped.

For example, when the number of ranks is 1 or 2, the terminal-specific reference signals are constituted by a spreading code length of two chips for Antenna Ports 7 and 8 and mapped in CDM Group 1. When the number of ranks is 3 or 4, the terminal-specific reference signals are constituted by a spreading code length of two chips for Antenna Ports 9 and 10 as well as Antenna Ports 7 and 8 and also mapped in CDM Group 2. When the number of ranks is 5 to 8, the terminal-specific reference signals are constituted by a spreading code length of four chips for Antenna Ports 7 to 14 and mapped in CDM Group 1 and CDM Group 2.

In addition, white resource elements indicate a region (shared channel region) in which the shared channels and/or the second control channel are arranged. The shared channel region may be mapped in rear OFDM symbols in the subframe, that is, OFDM symbols in the subframe different from the OFDM symbols in which the first control channels are arranged, and a prescribed number of OFDM symbols may be configured in each subframe. It is to be noted that all or part of the shared channel region may be mapped in prescribed OFDM symbols regardless of the first control channel region in the subframe. Alternatively, the region in which the shared channels are arranged may be configured for each resource block pair. In addition, the second control channel region may be constituted by all the OFDM symbols regardless of the number of OFDM symbols in the first control channel region.

Here, the number of resource blocks may be changed in accordance with a frequency bandwidth (system bandwidth) used in the communication system. For example, six to one hundred ten resource blocks may be used, and the unit is also referred to as a component carrier. Furthermore, the base station may constitute a plurality of component carriers for the terminal through frequency aggregation. For example, the base station may constitute five contiguous and/or non-contiguous component carriers in the frequency direction, each of which extends over 20 MHz, for the terminal, thereby establishing a total bandwidth of 100 MHz that can be used by the communication system.

Here, in the radio communication system according to this embodiment, aggregation of a plurality of serving cells (also referred to simply as cells) is supported in the downlink and the uplink (referred to as carrier aggregation). For example, in each serving cell, a transmission bandwidth of up to one hundred and ten resource blocks may be used. In addition, in the carrier aggregation, one of the serving cells is defined as a primary cell (Pcell). In addition, in the carrier aggregation, the serving cells other than the primary cell are defined as secondary cells (Scell).

Furthermore, downlink carriers corresponding to the serving cells are defined as downlink component carriers (DL-CCs). In addition, a downlink carrier corresponding to the primary cell is defined as a downlink primary component carrier (DLPCC). In addition, downlink carriers corresponding to the secondary cells are defined as downlink secondary component carriers (DLSCCs).

Furthermore, uplink carriers corresponding to the serving cells are defined as uplink component carriers (ULCCs). In addition, an uplink carrier corresponding to the primary cell is defined as an uplink primary component carrier (ULPCC). In addition, uplink carriers corresponding to the secondary cells are defined as uplink secondary component carriers (ULSCCs).

That is, in the carrier aggregation, a plurality of component carriers are aggregated in order to support a wide transmission bandwidth. Here, for example, a primary base station may be regarded as the primary cell and secondary base stations may be regarded as the secondary cells (the base stations make configurations for terminals) (also referred to as HetNet deployment with a carrier aggregation).

Details of the configuration of the PDCCHs will be described hereinafter. The PDCCHs are constituted by a plurality of control channel elements (CCEs). The number of CCEs used in each downlink component carrier depends on the downlink component carrier bandwidth, the number of OFDM symbols constituting the PDCCHs, and the number of transmission antenna ports for the downlink cell-specific reference signals according to the number of transmission antennas of the base station 100 used for communication. The CCEs are constituted by a plurality of downlink resource elements (each of which is a resource defined by an OFDM symbol and a subcarrier).

The CCEs used between the base station 100 and the terminal 200 are provided with numbers for identifying the CCEs. The numbering of the CCEs is performed on the basis of a predetermined rule. Here, CCE_t indicates a CCE having a CCE number t. The PDCCHs are constituted by an aggregation (CCE aggregation) including a plurality of CCEs. The number of CCEs constituting the aggregation is referred to as a "CCE aggregation level" (CCE aggregation level). The CCE aggregation level constituting the PDCCHs is constituted by the base station in accordance with a coding rate configured for the PDCCHs and the number of bits of DCI included in the PDCCHs. It is to be noted that a combination of CCE aggregation levels that can be used for a terminal is predetermined. In addition, an aggregation including n CCEs is referred to as "CCE Aggregation Level n".

A resource element group (REG) is constituted by four contiguous downlink resource elements in a frequency domain. Furthermore, a CCE is constituted by nine discrete different resource element groups in the frequency domain and a time domain. More specifically, interleaving is performed on all numbered resource element groups in the entirety of the downlink component carrier in units of resource element groups using a block interleaver, and nine resource element groups having consecutive numbers after the interleaving configure a CCE.

A region SS (search space) for searching for the PDCCHs is configured for each terminal. The SS is constituted by a plurality of CCEs. The SS is constituted by a plurality of CCEs having consecutive numbers including a CCE having a smallest number, and the number of the plurality of CCEs having consecutive numbers is predetermined. The SS for each CCE aggregation level is constituted by an aggregation of a plurality of PDCCH candidates. The SS is classified into a CSS (cell-specific SS), in which the numbers are the same inside the cell from the CCE having the smallest number, or a USS (UE-specific SS), in which the numbers are specific to the terminal from the CCE having the smallest number. In the CSS, PDCCHs to which control information read by a plurality of terminals, such as system information or information regarding paging, is assigned, or PDCCHs to which a downlink/uplink grant indicating an instruction to perform a fallback to a lower transmission scheme or random access is assigned may be arranged.

The base station transmits the PDCCHs using one or more CCEs in the SS configured for the terminal 200. The terminal 200 decodes received signals using one or more CCEs in the SS and performs a process for detecting the PDCCHs intended therefor (referred to as blind decoding). The terminal 200 configures a different SS for each CCE aggregation level. Thereafter, the terminal 200 performs the blind decoding using a predetermined combination of CCEs in the SS different between the CCE aggregation levels. In other words, the terminal 200 performs the blind decoding on PDCCH candidates in the SS different between the aggregation levels. This series of processes performed by the terminal 200 is referred to as monitoring of the PDCCHs.

The second control channel (E-PDCCH, PDCCHs on PDSCHs, enhanced PDCCHs) is mapped in the second control channel region. When the base station 100 transmits a control channel to the terminal 200 through the second control channel region, the base station 100 configures monitoring of the second control channel for the terminal 200 and maps the control channel intended for the terminal 200 in the second control channel region. In addition, when the base station 100 transmits control channels to the terminal 200 through the first control channel region, the base station 100 may map the control channels intended for the terminal 200 in the first control channel region regardless of the configuration of the monitoring of the second control channel for the terminal 200. In addition, when the base station 100 transmits control channels to the terminal 200 through the first control channel region, the base station 100 may map the control channel intended for the terminal 200 in the first control channel region if the monitoring of the second control channel is not configured for the terminal 200.

On the other hand, if the base station 100 has configured the monitoring of the second control channel, the terminal 200 performs blind decoding on control channels intended therefor in the first control channel region and/or control channels intended therefor in the second control channel region. In addition, if the base station 100 has not configured the monitoring of the second control channel, the terminal 200 does not perform blind decoding on control channels intended therefor in the first control channel.

Details of the control channel (E-PDCCH) mapped in the second control channel region will be described hereinafter.

The base station 100 configures the second control channel region for the terminal 200. The number of RBs constituting the second control channel region is a multiple of a prescribed value. For example, the number of RBs constituting the second control channel region is a multiple of four. That is, the second control channel region is constituted in units of a multiple of four of RBs. The base station 100 maps the E-PDCCH intended for the terminal 200 in the configured second control channel region. In addition, the base station 100 may map an E-PDCCH intended for a terminal different from the terminal 200. That is, a plurality of E-PDCCHs for a plurality of terminals may be multiplexed in the second control channel region. Here, the E-PDCCH is constituted by a plurality of enhanced control channel elements (E-CCEs). Here, the E-CCEs are units of constitution of the control channels.

The second control channel region is constituted by a plurality of E-CCEs. The number of E-CCEs in the second control channel region is defined by a prescribed value. In addition, the number of E-CCEs in the second control channel region may be implicitly determined on the basis of control information regarding the second control channel constituted by the base station 100. For example, the number of E-CCEs in the second control channel region may be determined by the number of PRBs in the second control channel region constituted by the base station 100. Alternatively, the number of E-CCEs in the second control channel region may be explicitly determined on the basis of the control information regarding the second control channel constituted by the base station 100.

In addition, the E-CCEs are constituted by a plurality of E-REGs (enhanced resource element groups). Here, the E-REGs are used for defining the mapping of control channels in resource elements. In addition, each of the E-REGs is constituted by a plurality of resource elements in a single RB. It is to be noted that each of the E-REGs may be constituted by a plurality of resource elements in a plurality of RBs, instead. For example, each of the E-REGs may be constituted by a plurality of resource elements in a plurality of RBs in the second control channel region. Alternatively, for example, each of the E-REGs may be constituted by a plurality of resource elements in a plurality of RBs constituting the E-CCEs. The number of E-REGs constituting each E-CCE is defined by a prescribed value. Alternatively, the number of E-REGs configuring one E-CCE may be implicitly determined on the basis of the control information regarding the second control channel constituted by the base station 100. For example, the number of E-REGs constituting each E-CCE may be determined using a mapping method (for example, distributed mapping or localized mapping) used in the second control channel region constituted by the base station 100. Alternatively, for example, the number of E-REGs constituting each E-CCE may be determined using a method for mapping the E-CCEs and the terminal-specific reference signals (a method for mapping the E-CCEs and the antenna ports) constituted by the base station 100. Alternatively, the number of E-REGs constituting each E-CCE may be explicitly determined on the basis of the control information regarding the second control channel constituted by the base station 100.

In addition, a plurality of E-REGs configure each RB. Here, a plurality of mapping rules (mapping methods) are defined for the E-REGs configuring an RB and the E-REGs configuring an E-CCE. One of the methods for mapping the E-REGs configuring an RB and the E-REGs configuring an E-CCE is distributed mapping (distributed mapping rule). In the distributed mapping rule, mapping is performed such that the E-REGs are distributed among the plurality of resource blocks. In the distributed mapping, part or all of the E-REGs configuring an E-CCE are mapped in the E-REGs in a plurality of RBs. In addition, in the distributed mapping, part or all of the E-REGs configuring an RB are mapped from the E-REGs in the plurality of E-CCEs. In addition, another of the methods for mapping the E-REGs configuring an RB and the E-REGs configuring an E-CCE is localized mapping (localized mapping rule). In the localized mapping rule, resources are mapped in resource blocks in a localized manner. In the localized mapping, all the E-REGs configuring an E-CCE are mapped in the E-REGs in one RB. In addition, in the localized mapping, part or all of the E-REGs configuring an RB are mapped from all the E-REGs in a plurality of RBs.

In addition, the number of E-REGs constituting each RB is defined by a prescribed value. Alternatively, the number of E-REGs constituting each RB may be implicitly determined on the basis of the control information regarding the second control channel constituted by the base station 100. For example, the number of E-REGs constituting each RB may be determined using the mapping method (for example, distributed mapping or localized mapping) used in the second control channel region constituted by the base station 100. Alternatively, for example, the number of E-REGs constituting each RB may be determined using a method for mapping the E-CCEs and the terminal-specific reference signals (a method for mapping the E-CCEs and the antenna ports) constituted by the base station 100. Alternatively, the number of E-REGs constituting each E-CCE may be explicitly determined on the basis of the control information regarding the second control channel constituted by the base station 100.

Thus, the method for mapping the E-PDCCH in the PRBs (that is, a perspective on mapping from a logical structure to a physical structure) used by the base station 100 for the terminal 200 is as follows. First, the E-PDCCH is mapped in one or a plurality of E-CCEs. Next, in the distributed mapping, the plurality of E-REGs constituting the E-CCEs are mapped in E-REGs in a plurality of RBs. On the other hand, in the localized mapping, the plurality of E-REGs constituting the E-CCEs are mapped in E-REGs in an RB. The plurality of RBs in which the E-REGs are mapped in part or all of the plurality of PRBs constituting the second control channel region.

Here, various methods may be used to map, in the PRBs (physical RBs), the RBs (logical RBs) in which the E-REGs are mapped. The mapping of the logical RBs in the physical RBs is performed in accordance with a predetermined rule. For example, the logical RBs are mapped in the physical RBs in ascending order of numbers. For example, the mapping is performed such that the logical RBs are distributed among the physical RBs.

On the other hand, a method for identifying the E-CCEs (that is, a perspective on mapping from the physical structure to the logical structure) used by the terminal 200 to detect the E-PDCCH transmitted from the base station 100 is as follows. First, the terminal 200 identifies the PRBs in the second control channel region constituted by the base station 100 as RBs constituting the second control channel region. Next, the terminal 200 identifies the E-REGs configuring each of the RBs constituting the second control channel region. Next, in the case of the distributed mapping, the terminal 200 identifies the E-CCEs constituted by the plurality of E-REGs while assuming that the plurality of E-REGs constituting the RBs are mapped in the E-REGs in the plurality of E-CCEs. Furthermore, the terminal 200 performs a process (blind decoding) for detecting the E-PDCCH on the basis of the identified E-CCEs. A method that will be described later is used as the process for detecting the E-PDCCH.

The method for mapping the RBs constituting the second control channel region and the E-CCEs will be described hereinafter with reference to specific examples.

Figure 5:
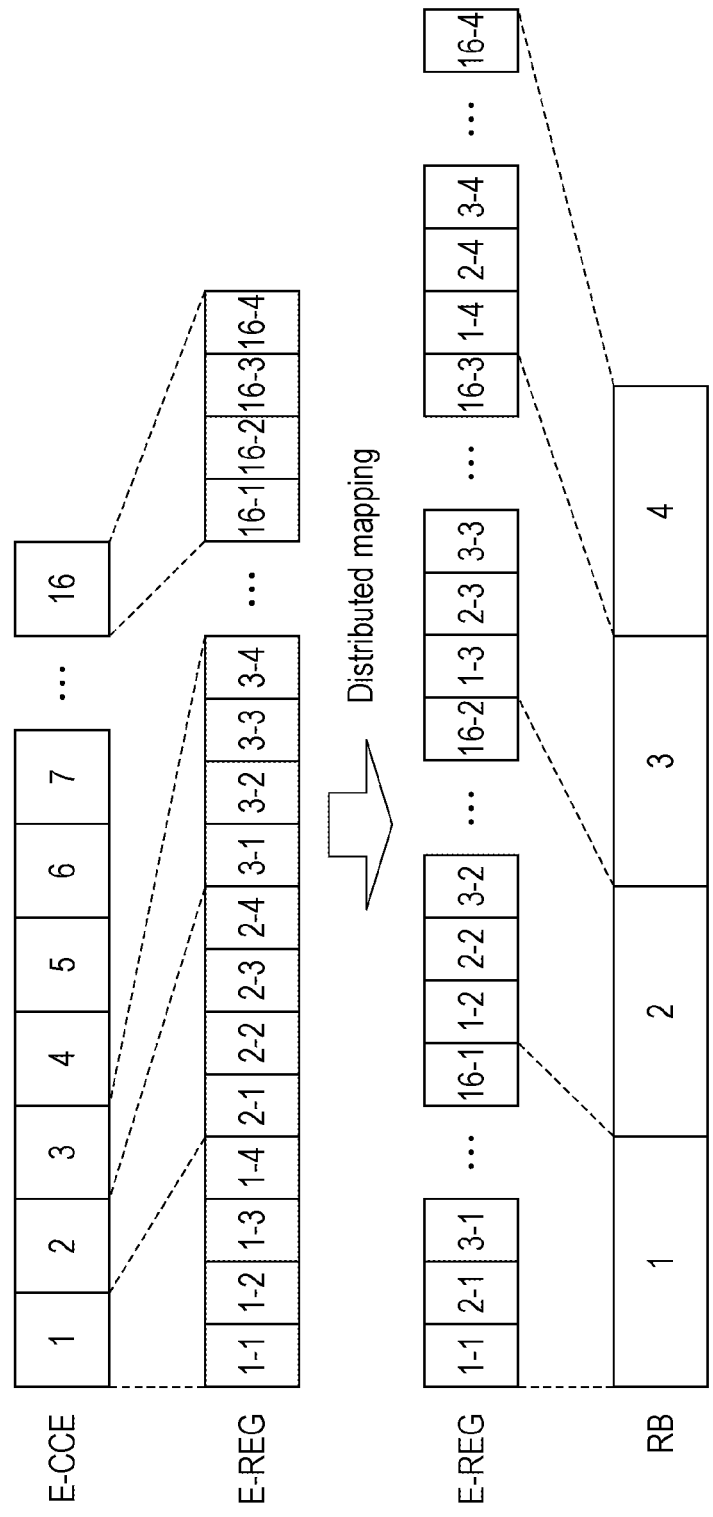
FIG. 5 is a diagram illustrating an example of a case in which E-REGs constituting each RB are subjected to distributed mapping.

FIG. 5 is a diagram illustrating an example of a case in which the E-REGs constituting each RB are subjected to the distributed mapping. In this example, the number of RBs in the second control channel region is 4. The number of E-REGs constituting each E-CCE is 4. In this case, the total number of E-REGs in the second control channel region is 64. In addition, the total number of E-CCEs in the second control channel region is 16. In addition, the E-REGs constituting each E-CCE are mapped in E-REGs in different RBs. More specifically, E-REG 1-1, E-REG 1-2, E-REG 1-3, and E-REG 1-4 constituting E-CCE 1 are mapped in RB 1, RB 2, RB 3, and RB 4, respectively. On the other hand, the E-REGs constituting each RB are mapped from E-REGs in different E-CCEs. More specifically, sixteen E-REGs constituting RB 1 are mapped from E-REG 1-1, E-REG 2-1, E-REG 3-1, E-REG 4-1, E-REG 5-1, E-REG 6-1, E-REG 7-1, E-REG 8-1, E-REG 9-1, E-REG 10-1, E-REG 11-1, E-REG 12-1, E-REG 13-1, E-REG 14-1, E-REG 15-1, and E-REG 16-1, which constitute E-CCEs 1 to 16, respectively.

Figure 6:
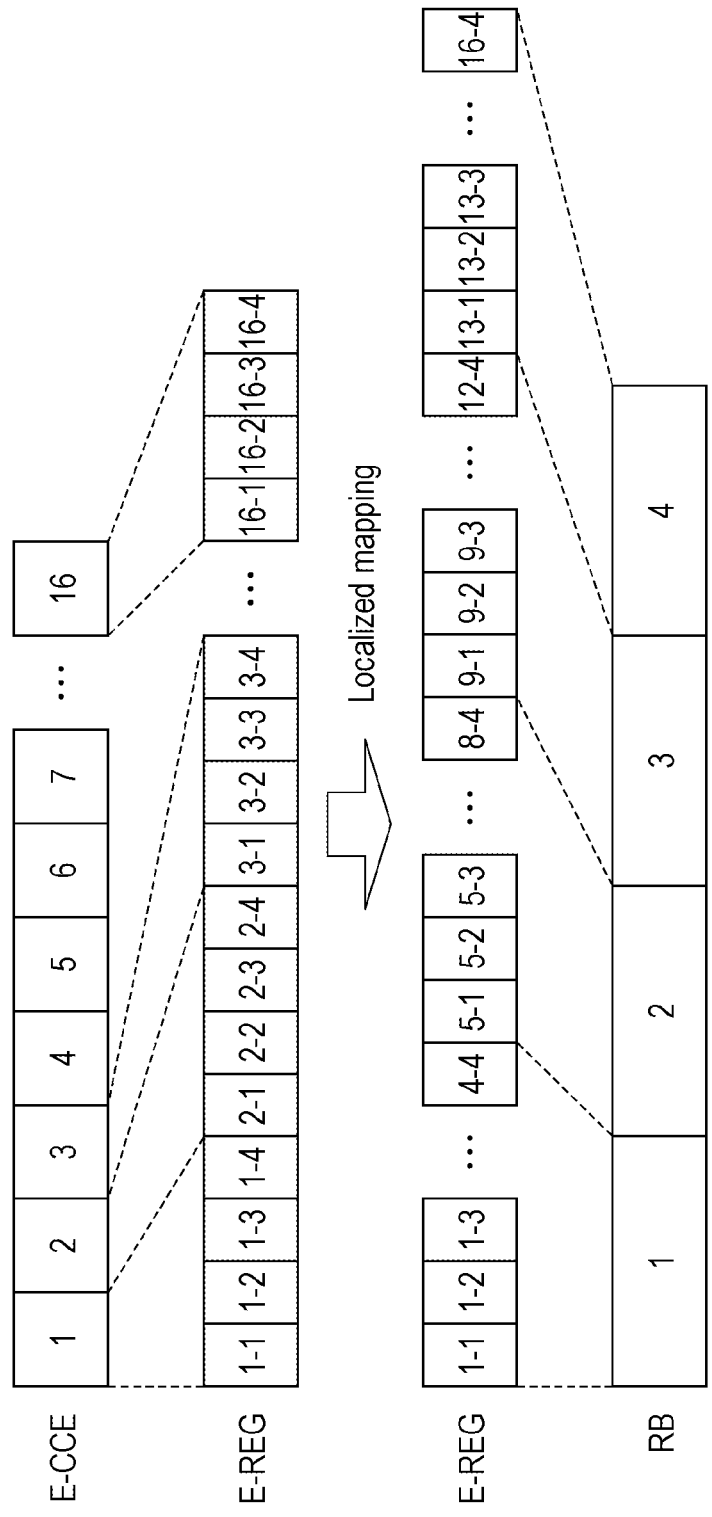
FIG. 6 is a diagram illustrating an example of a case in which the E-REGs constituting each RB are subjected to localized mapping.

FIG. 6 is a diagram illustrating an example of a case in which the E-REGs constituting each RB are subjected to the localized mapping. In this example, the number of RBs in the second control channel region is 4. The number of E-REGs constituting each E-CCE is 4. In this case, the total number of E-REGs in the second control channel region is 64. In addition, the total number of E-CCEs in the second control channel region is 16. In addition, all the E-REGs constituting each E-CCE are mapped in E-REGs in the same RB. More specifically, E-REG 1-1, E-REG 1-2, E-REG 1-3, and E-REG 1-4 constituting E-CCE 1 are mapped in RB 1. On the other hand, the E-REGs constituting each RB are mapped from the E-REGs constituting the plurality of E-CCEs. More specifically, sixteen E-REGs constituting RB 1 are mapped from E-REG 1-1, E-REG 1-2, E-REG 1-3, E-REG 1-4, E-REG 2-1, E-REG 2-2, E-REG 2-3, E-REG 2-4, E-REG 3-1, E-REG 3-2, E-REG 3-3, E-REG 3-4, E-REG 4-1, E-REG 4-2, E-REG 4-3, and E-REG 4-4, which constitute E-CCEs 1 to 4.

Next, details of the structure of the E-REGs constituting each RB will be described. The E-REGs used between the base station 100 and the terminal 200 are provided with numbers for identifying the E-REGs. The numbering of the E-REGs is performed on the basis of a predetermined rule. Various methods may be used in the rule used for the numbering of the E-REGs. In addition, the E-REG numbers provided as a result of the numbering are associated with the E-REGs constituting the RBs illustrated in FIGS. 5 and 6. In addition, the E-REG numbers constituting each RB are used in common between the distributed mapping and the localized mapping. In addition, the numbering of the E-REGs is preferably performed while taking into consideration both the distributed mapping and the localized mapping. For example, the numbering of the E-REGs is performed such that the E-CCEs in the localized mapping are associated with E-REG groups, which will be described later. Although the rule of the numbering of the E-REGs in an RB will be described hereinafter, the rule may also be applied to the numbering of the E-REGs performed over a plurality of RBs.

An example of the rule used for the numbering of the E-REGs is as follows. First, an RB is grouped in units of a prescribed number of resource elements. For example, an RB is grouped in units of a prescribed number of subcarriers. For example, an RB is grouped in units of three subcarriers, and four groups are configured. These groups are also referred to as E-REG groups. The numbering of the E-REGs is performed for each E-REG group. Each E-REG group is constituted by a plurality of E-REGs. In each E-REG group, the numbering of the E-REGs begins with a resource element whose subcarrier number is smaller and whose OFDM symbol number is smaller (that is, a resource element defined by a subcarrier whose frequency is lower and whose OFDM symbol is earlier). In addition, in the numbering of the E-REGs, the time direction takes priority. More specifically, the numbering is sequentially performed in the time direction from the resource element from which the numbering begins. When a resource element of a last OFDM symbol in a subframe has been numbered, a next E-REG number is given to a resource element of a first OFDM symbol in a subcarrier whose subcarrier number is larger by 1. On the basis of such a rule, the E-REGs are numbered in each E-REG group. Similarly, the numbering is performed in the same manner in the other E-REG groups.

Here, in the numbering of the E-REGs, resource elements in which the terminal-specific reference signals, the cell-specific reference signals, the channel state information reference signals, and/or broadcast channels are mapped may be simply numbered (through puncturing). That is, the numbering of the E-REGs is performed on all the resource elements in each RB independently of the signals mapped in the resource elements. The terminal 200 recognizes that control channels are not mapped in the resource elements in which the terminal-specific reference signals, the cell-specific reference signals, the channel state information reference signals, and/or the broadcast channels are mapped. Therefore, the definition of the E-REGs is determined independently of the signals mapped in the resource elements, thereby reducing the amount of processing performed by, and the storage capacity of, the base station 100 and the terminal 200.

Here, in the numbering of the E-REGs, the resource elements in which the cell-specific reference signals, the channel state information reference signals, and/or the broadcast channels are mapped may be simply numbered (through puncturing). In addition, the numbering of the E-REGs is performed while taking into consideration only the resource elements in which the terminal-specific reference signals are mapped. For example, the numbering of the E-REGs is performed while skipping only the resource elements in which the terminal-specific reference signals are mapped (through rate matching). That is, the numbering of the E-REGs is performed on all the resource elements in each RB independently of the signals mapped in the resource elements, except for the terminal-specific reference signals. The terminal 200 recognizes that control channels are not mapped in the resource elements in which the terminal-specific reference signals, the cell-specific reference signals, the channel state information reference signals, and/or the broadcast channels are mapped. Therefore, the definition of the E-REGs is determined independently of the signals mapped in the resource elements except for the terminal-specific reference signals, thereby reducing the amount of processing performed by, and the storage capacity of, the base station 100 and the terminal 200. In addition, if the second control channel is subjected to the demodulation process using the terminal-specific reference signals, the terminal-specific reference signals are mapped in the RBs in which the second control channel is mapped. Therefore, the second control channel can be mapped while taking into consideration the overhead of the resources caused by the terminal-specific reference signals.

Here, in the numbering of the E-REGs, the numbering may be performed while skipping the resource elements (through rate matching) in which the terminal-specific reference signals, the cell-specific reference signals, the channel state information reference signals, and/or the broadcast channels are mapped. That is, the numbering of the E-REGs is performed on all the resource elements in each RB, except for the resource elements in which the terminal-specific reference signals, the cell-specific reference signals, the channel state information reference signals, and/or the broadcast channels are mapped. Therefore, the second control channel can be mapped while taking into consideration the overhead of the resources caused by the terminal-specific reference signals, the cell-specific reference signals, the channel state information reference signals, and/or the broadcast channels.

Figure 7:
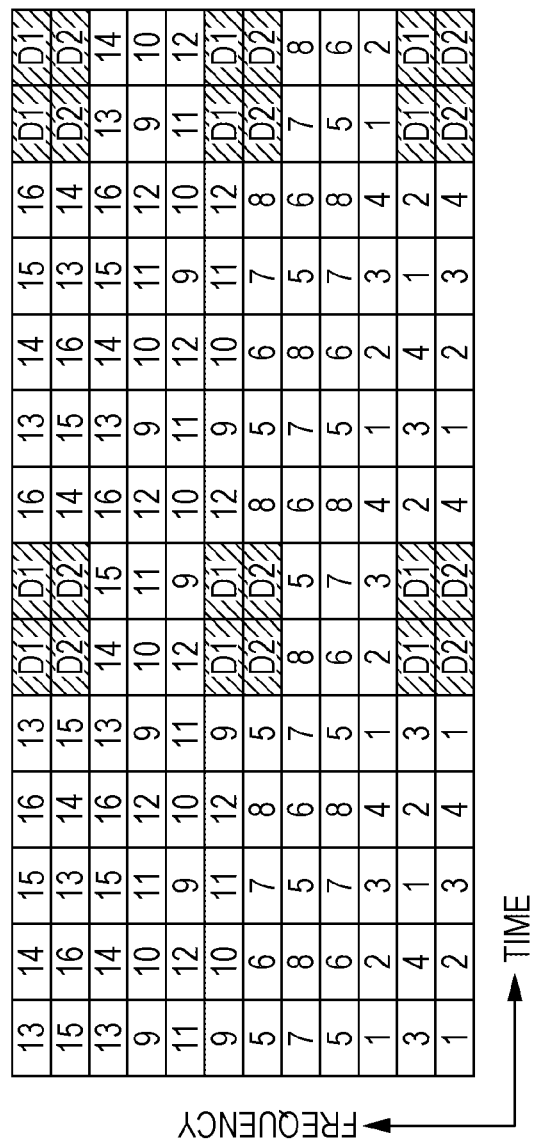
FIG. 7 is a diagram illustrating an example of the structure of the E-REGs in each RB.

FIG. 7 is a diagram illustrating an example of the structure of the E-REGs in an RB. In the figure, resource elements in an RB when the number of E-REGs constituting each RB is 16 are illustrated. Resource elements indicated by D1 and D2 indicate terminal-specific reference signals. In addition, E-REGs are defined in resource elements other than the resource elements in which the terminal-specific reference signals are mapped. Resource elements indicated by 1 to 16 indicate the E-REGs, and each number indicates an E-REG number. That is, E-REG 1 to E-REG 16 are illustrated. For example, E-REG 1 is constituted by nine resource elements. In addition, four E-REG groups are constituted in units of three subcarriers from subcarriers whose frequency are lower. An E-REG group having a lowest frequency is constituted by E-REG 1 to E-REG 4. An E-REG group having a second lowest frequency is constituted by E-REG 5 to E-REG 8. An E-REG group having a third lowest frequency is constituted by E-REG 9 to E-REG 12. An E-REG group having a fourth lowest frequency is constituted by E-REG 13 to E-REG 16.

The E-REGs illustrated in FIG. 7 are associated with the E-REGs constituting the RBs illustrated in FIGS. 5 and 6. For example, E-REG 1 to E-REG 16 illustrated in FIG. 7 are associated with E-REG 1-1, E-REG 2-1, E-REG 3-1, E-REG 4-1, E-REG 5-1, E-REG 6-1, E-REG 7-1, E-REG 8-1, E-REG 9-1, E-REG 10-1, E-REG 11-1, E-REG 12-1, E-REG 13-1, E-REG 14-1, E-REG 15-1, and E-REG 16-1, respectively, illustrated in FIG. 5. In addition, E-REG 1 to E-REG 16 illustrated in FIG. 7 are associated with E-REG 1-1, E-REG 1-2, E-REG 1-3, E-REG 1-4, E-REG 2-1, E-REG 2-2, E-REG 2-3, E-REG 2-4, E-REG 3-1, E-REG 3-2, E-REG 3-3, E-REG 3-4, E-REG 4-1, E-REG 4-2, E-REG 4-3, and E-REG 4-4, respectively, illustrated in FIG. 6.

Here, the E-REGs constituting the RBs are subjected to the distributed mapping, and the E-REGs constituting the RBs illustrated in FIG. 6 are subjected to the localized mapping. That is, the E-REGs constituting the RBs can be used in common independently of the distributed mapping and the localized mapping. In addition, the E-REGs constituting the E-CCEs illustrated in FIG. 5 are associated with the E-REGs constituting the E-REG groups in the RBs in the localized mapping. That is, an RB constituted by the E-REGs subjected to the localized mapping is constituted by a plurality of E-CCEs. In addition, the E-CCEs are subjected to FDM and mapped in the RB. Therefore, as a result of the distributed mapping and the localized mapping, the E-CCEs can be mapped in the physical resources in a localized manner in the localized mapping without changing the structure of the E-REGs constituting the RB.

The structure of the E-REGs in the RB illustrated in FIG. 7 may be different between prescribed RBs. For example, the structure of the E-REGs in the RB may be configured for part or all of the plurality of RBs constituting the second control channel region. In addition, the prescribed resources constituting the RB may be subjected to a cyclic shift for each RB in part or all of the plurality of RBs constituting the second control channel region. For example, the E-REG groups constituting the RB may be subjected to a cyclic shift for each RB in part or all of the plurality of RBs constituting the second control channel region.

Figure 8:
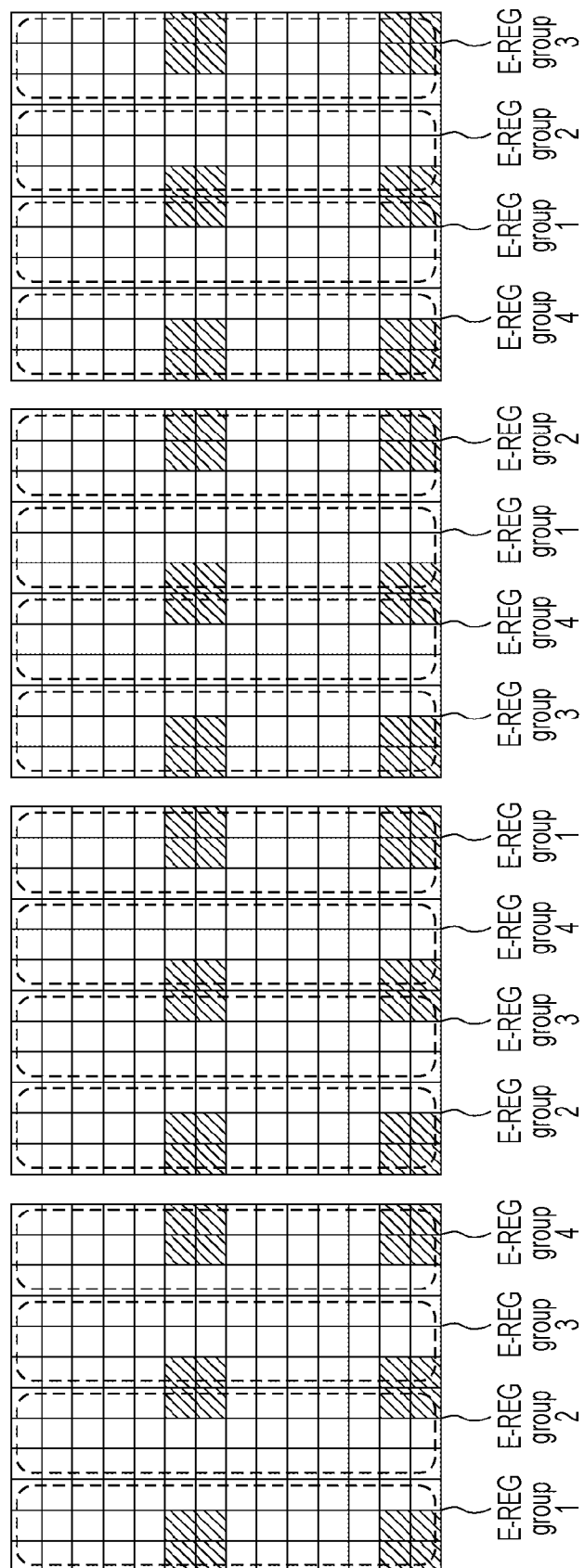
FIG. 8 is a diagram illustrating an example of the structure of E-REGs in each RB in a second control channel region.

FIG. 8 is a diagram illustrating an example of the structure of the E-REGs configured for each RB in the second control channel region. In FIG. 8, four E-REG groups constituting each RB are subjected to a cyclic shift in the frequency direction in units of four RBs in the second control channel region. Here, an E-REG group indicated by the same E-REG group number is constituted by the same plurality of E-REGs. For example, In FIG. 7, E-REG Group 1 is constituted by E-REGs 1 to 4. In addition, the number of E-REG groups in each RB may be the same as the number of RBs in the second control channel region or the number of RBs constituting resources in which the E-PDCCH is cyclically mapped. Therefore, the resource elements in each E-REG group are mapped in different resource elements in each RB subjected to the cyclic shift. Therefore, the total number of resource elements in each E-REG group mapped in the four RBs is the same as the number of resource elements at a time when the resource elements are mapped in the entirety of an RB. That is, the overhead of signals mapped in each RB, such as the terminal-specific reference signals, the cell-specific reference signals, the channel state information reference signals, and/or the broadcast channels, can be the same between the E-REG groups.

It is to be noted that although a case has been described in the above description in which the structure of E-REGs in each E-CCE is the same between the localized mapping and the distributed mapping, the structure of E-REGs is not limited to this. The structure and/or the number of E-REGs in each E-CCE may be different between the localized mapping and the distributed mapping.

It is to be noted that although a case in which the number of E-REGs in each RB is 16 has been described in the above description, the number of E-REGs in each RB is not limited to this. The number of E-REGs in each RB is realized by a prescribed value. For example, the present invention may be applied to a case in which the number of E-REGs in each RB is 12.

Details of the E-PDCCH will be described hereinafter. The control channel (E-PDCCH) mapped in the second control channel region is processed for each piece of control information for one or a plurality of terminals and subjected, as with the data channels, to the scrambling process, the modulation process, the layer mapping process, the precoding process, and the like. In addition, the control channel mapped in the second control channel region is subjected to the precoding process along with the terminal-specific reference signals.

In addition, the control channel mapped in the second control channel region may be mapped while including different pieces of control information between a forward slot (first slot) and a rear slot (second slot) in each subframe. That is, the structure of E-REGs illustrated in FIG. 7 may be configured for each slot. For example, control channels including assignment information (downlink assignment information) regarding the downlink shared channels transmitted from the base station 100 to the terminal 200 are mapped in the forward slot in each subframe. On the other hand, control channels including assignment information (uplink assignment information) regarding the uplink shared channels transmitted from the terminal 200 to the base station 100 are mapped in the rear slot in each subframe. It is to be noted that the control channels including the uplink assignment information from the base station 100 to the terminal 200 may be mapped in the forward slot in each subframe, and the control channels including the downlink assignment information from the terminal 200 to the base station 100 may be mapped in the rear slot in each subframe, instead.

In addition, data channels intended for the terminal 200 and/or another terminal may be mapped in the forward and/or rear slots in the second control channel region. In addition, control channels intended for the terminal 200 and/or another terminal may be mapped in the forward and/or rear slots in the second control channel region.

The SS (search space; or search region), which is a region of the terminal 200 for searching for (retrieving and blind decoding) the second control channel, will be described hereinafter. The base station 100 configures the second control channel region for the terminal 200, and the terminal 200 identifies a plurality of E-CCEs in the second control channel region. In addition, the base station 100 configures the SS for the terminal 200. For example, the base station 100 configures an E-CCE number for enabling the terminal 200 to identify the SS. For example, the base station 100 configures, for the terminal 200, an E-CCE number that serves as a start E-CCE number (reference E-CCE number) for identifying the SS. The terminal 200 identifies the SS specific thereto on the basis of the start E-CCE number and a predetermined rule. Here, the start E-CCE number is constituted by control information specifically transmitted from the base station 100 to the terminal 200. Alternatively, the start E-CCE number may be determined also on the basis of an RNTI constituted by the base station 100 specifically to the terminal 200. Alternatively, the start E-CCE number may be determined on the basis of the control information specifically transmitted from the base station 100 to the terminal 200 and the RNTI constituted by the base station 100 specifically to the terminal 200. Alternatively, the start E-CCE number may be determined on the basis of a subframe number provided for each subframe or a slot number provided for each slot. As a result, the start E-CCE number becomes information specific to the terminal 200 and specific to each subframe or slot. Therefore, the SS of the terminal 200 may be configured in such a way as to be different between the subframes or the slots. In addition, one of various methods may be used as the rule for identifying the SS on the basis of the start E-CCE number.

The SS of the terminal 200 for searching for the second control channel may be constituted by one or more E-CCEs. That is, the SS is constituted by an aggregation (E-CCE aggregation) including one or more E-CCEs using, as units, the E-CCEs included in region configured as the second control region. The number of E-CCEs constituting the aggregation will be referred to as an "E-CCE aggregation level". The SS is constituted by a plurality of E-CCEs having consecutive numbers including an E-CCE having a smallest number, and the number of one or more E-CCEs having consecutive numbers is predetermined. The SS at each E-CCE aggregation level is constituted by an aggregation of a plurality of second control channel candidates. Alternatively, the number of second control channel candidates may be determined for each E-CCE aggregation level. Alternatively, the SS may be configured for each E-CCE aggregation level. For example, the start E-CCE configuring the SS may be configured for each E-CCE aggregation level.

Figure 9:
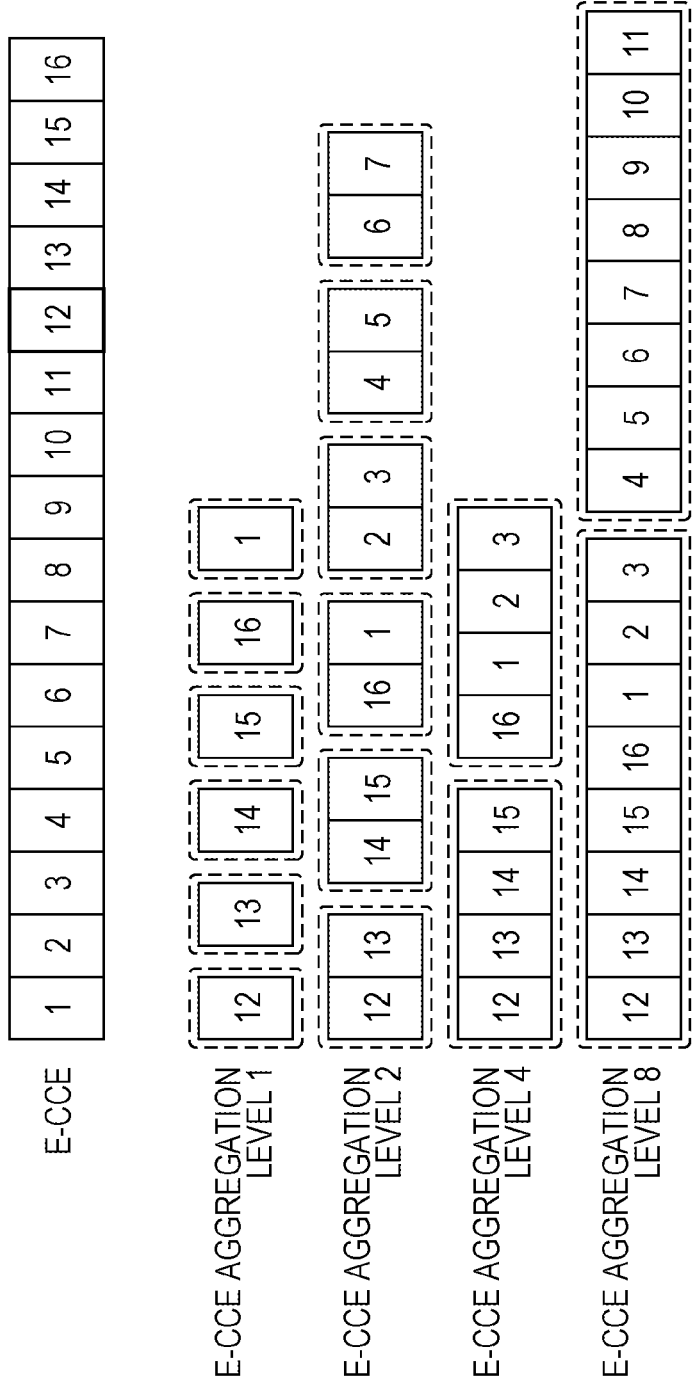
FIG. 9 is a diagram illustrating an example of an SS of the terminal 200 for searching for a second control channel.

The base station 100 transmits the second control channel using one or more of the E-CCEs configured in the terminal 200. The terminal 200 decodes received signals using one or more E-CCEs in the SS and performs a process for detecting second control channel intended therefor (blind decoding). As illustrated in FIG. 9, the terminal 200 configures a different SS for each E-CCE aggregation level. Thereafter, the terminal 200 performs blind decoding using a predetermined combination of E-CCEs in the SS different between the E-CCE aggregation levels. In other words, the terminal 200 performs the blind decoding on second control channel candidates in the SS different between the E-CCE aggregation levels (monitors the E-PDCCH).

FIG. 9 is a diagram illustrating an example of the SS of the terminal 200 for searching for the second control channel. The number of E-CCEs in the second control channel region is 16. The start E-CCE number is E-CCE 12. The SS shifts from the start E-CCE number in a direction in which the E-CCE number increases. In addition, in the SS, when the E-CCE number has become a largest one of the E-CCE numbers of the E-CCEs in the second control channel region, the E-CCE number to which the SS shifts next is a smallest one of the E-CCE numbers of the E-CCEs in the second control channel region. That is, if the number of E-CCEs in the second control channel region is denoted by N and the start E-CCE number is denoted by X, the m-th E-CCE number to which the SS shifts is expressed by mod(X+m, N). Here, mod(A, B) denotes a remainder obtained by dividing A by B. That is, the SS is cyclically configured in the E-CCEs in the second control channel region. More specifically, if it is assumed that the number of E-PDCCH candidates when the E-CCE aggregation level is 1, 2, 4, and 8 are 6, 6, 2, and 2, respectively, the E-PDCCH candidates are as illustrated in FIG. 9. For example, in the case of E-CCE Aggregation Level 4, the number of E-PDCCH candidates is 2. First E-PDCCH candidates are constituted by E-CCE 12, E-CCE 13, E-CCE 14, and E-CCE 15. Second E-PDCCH candidates are constituted by E-CCE 16, E-CCE 1, E-CCE 2, and E-CCE 3. Therefore, as described with reference to FIGS. 5 and 6, the E-PDCCH can be mapped in a prescribed RB by constituting the second control channel region in units of the prescribed RB. That is, the resources in which the E-PDCCH is mapped can be efficiently configured.

FIG. 10 is a diagram illustrating an example of the SS of the terminal 200 for searching for the second control channel. A difference from the example of the SS illustrated in FIG. 9 is as follows. Each E-CCE constituting an E-PDCCH is cyclically configured among E-CCEs smaller than the E-CCEs in the second control channel region. For example, in the example illustrated in FIG. 10, among the sixteen E-CCEs, resources of four E-CCEs having smaller E-CCE numbers are configured as units of mapping of an E-PDCCH. For example, in the case of E-CCE Aggregation Level 2, the number of E-PDCCH candidates is 6. In addition, the E-PDCCH candidates are configured (defined), with regard to the units of mapping of an E-PDCCH, to be mapped in such a way as to be mapped in as many units as possible. For example, a first E-PDCCH candidate is constituted by E-CCE 12 and E-CCE 9. A second E-PDCCH candidate is constituted by E-CCE 16 and E-CCE 13. A third E-PDCCH candidate is constituted by E-CCE 4 and E-CCE 1. A fourth E-PDCCH candidate is constituted by E-CCE 8 and E-CCE 5. A fifth E-PDCCH candidate is constituted by E-CCE 10 and E-CCE 11. A sixth E-PDCCH candidate is constituted by E-CCE 14 and E-CCE 15. As a result, as described with reference to FIGS. 5 and 6, the E-PDCCH can be mapped in a prescribed RB by constituting the second control channel region using the prescribed RB as a unit. That is, the resources in which the E-PDCCH is mapped can be efficiently configured. In addition, when each RB is constituted by prescribed E-CCEs in the localized mapping, one E-PDCCH can be mapped in only one RB. It is to be noted that the E-PDCCH in the case of E-CCE Aggregation Level 8 is mapped in two RBs. Therefore, when a terminal-specific precoding process is performed on the E-PDCCH, gain given by the precoding process can be efficiently obtained. In addition, the terminal 200 can identify candidates for detecting E-PDCCH mapped in such way.

It is to be noted that although all the E-CCEs obtained from the PRBs configured as the second control channel region are determined as a range in which the SS is configured in the description with reference to FIGS. 9 and 10, the range in which the SS is configured is not limited to this. For example, E-CCEs obtained from part of the PRBs configured as the second control channel region may be determined as the range in which the SS is configured. That is, the PRBs or the E-CCEs configured as the second control channel region and the PRBs or the E-CCEs configured as the SS may be different from each other. In this case, too, the PRBs configured as the SS preferably use a multiple of a prescribed value as units. For example, if the number of PRBs configured as the second control channel region is 16 and RB numbers in the second control channel region are RB 1 to RB 16, the E-CCEs configured as the SS may be E-CCEs obtained from RB 5 to RB 8 and RB 13 to RB 16. Alternatively, the resources configured as the SS may be E-CCEs that use a multiple of a prescribed value as units. If E-CCEs obtained from part of the PRBs configured as the second control channel region are determined as the range in which the SS is configured, the base station 100 transmits, to the terminal 200, information indicating the PRBs configured as the second control channel region and information indicating the range in the PRBs in which the SS is configured through the RRC signaling.

It is to be noted that although cases in which the E-CCE aggregation level is 1, 2, 4, and 8 have been described, the E-CCE aggregation level is not limited to these. Another E-CCE aggregation level may be used in order to change prescribed reception quality of the E-PDCCH and overhead caused by the E-PDCCH.

Association between the E-PDCCH (E-CCEs and E-REGs) and antenna ports for the terminal-specific reference signals will be described hereinafter. The association between the E-PDCCH and the antenna ports for the terminal-specific reference signals uses a predetermined rule. In addition, a plurality of rules of the association may be determined. If a plurality of associations between the E-PDCCH and the antenna ports for the terminal-specific reference signals are determined, information indicating one of the plurality of rules of the association is explicitly or implicitly transmitted. In a transmission method, the information indicating one of the plurality of rules of the association is transmitted through the RRC signaling and configured. In addition, in another transmission method, if one of the plurality of rules of the association is associated with control information included in the control information regarding the second control channel transmitted from the base station 100, the terminal 200 can identify the one of the plurality of rules of the association. For example, one of the plurality of rules of the association may be indirectly transmitted from information indicating the distributed mapping or the localized mapping transmitted through the RRC signaling. Alternatively, the information indicating one of the plurality of rules of the association may be configured for each terminal. Alternatively, the information indicating one of the plurality of rules of the association may be configured for each second control channel region configured. Therefore, if a plurality of second control channel regions are configured, the terminal 200 may independently configure one of the plurality of rules of the association for each second control channel region.

An example of the rule of the association between the E-PDCCH and the antenna ports for the terminal-specific reference signals is a terminal-specific precoding antenna port rule. In the terminal-specific precoding antenna port rule, a precoding process specific to a terminal that transmits the E-PDCCH can be performed. Each RB is divided into a prescribed number of resources. The resources obtained as a result of the division are associated with different antenna ports for the terminal-specific reference signals. For example, each RB is divided into four resources. The four resources obtained as a result of the division are associated with Antenna Ports 7 to 10, respectively. In addition, the resources (division resources) obtained as a result of the division may be associated with the E-CCEs in the localized mapping. That is, the E-CCEs in the localized mapping are associated with different antenna ports. In addition, if the E-CCE aggregation level is 2 or more, each E-PDCCH may be transmitted using one of the antenna ports associated with the division resources mapped. The terminal 200 determines an antenna port for the terminal-specific reference signals for performing the demodulation process in accordance with the resources of the E-PDCCH candidates subjected to the blind decoding. In addition, the base station 100 may transmit, to the terminal 200, the antenna port for the terminal-specific reference signals associated with the E-PDCCH candidates subjected to the blind decoding. The terminal-specific precoding antenna port rule is preferably used when the localized mapping described with reference to FIG. 6 is performed. It is to be noted that the terminal-specific precoding antenna port rule may be used even when the distributed mapping described with reference to FIG. 5 is performed.

Another example of the rule of the association between the E-PDCCH and the antenna ports for the terminal-specific reference signals is a shared antenna port rule. In the shared antenna port rule, a plurality of E-PDCCHs share a prescribed antenna port for the terminal-specific reference signals. In addition, in the shared antenna port rule, each terminal performs the process for demodulating the E-PDCCH using the prescribed antenna port for the terminal-specific reference signals, and the terminal-specific reference signals of the antenna port are shared by a plurality of terminals. For example, in the second control channel region in which the shared antenna port rule is used, the terminal-specific reference signals of Antenna Ports 7 and 9 are configured for the process for demodulating the E-PDCCH. More specifically, the E-PDCCH mapped in the second control channel region in which the shared antenna port rule is used is subjected to transmission diversity such as SFBC using the two antenna ports, namely Antenna Ports 7 and 9. When the two antenna ports, namely Antenna Ports 7 and 9, are used, Antenna Ports 7 and 9 use power twice as high as when signals are transmitted using one antenna port for the reference signals mapped in different resource elements. Therefore, the terminal 200 can perform accurate channel estimation. The shared antenna port rule is preferably used when the distributed mapping described with reference to FIG. 5 is performed. It is to be noted that the shared antenna port rule may be performed even when the localized mapping described with reference to FIG. 6 is performed.

It is to be noted that although a case in which the method for mapping the RBs and the E-CCEs constituting the second control channel region is defined in the distributed mapping and the localized mapping has been described in the above description, the method for mapping the RBs and the E-CCEs constituting the second control channel region is not limited to these. For example, the method for mapping the RBs and the E-CCEs constituting the second control channel region may be defined on the basis of the rule of the association between the E-PDCCH and the antenna ports for the terminal-specific reference signals, instead. The method for mapping the RBs and the E-CCEs constituting the second control channel region may be defined on the basis of the terminal-specific precoding antenna port rule and the shared antenna port rule, instead. For example, the distributed mapping in the above description may be mapping at a time when the shared antenna port rule is used. In addition, the localized mapping in the above description may be mapping at a time when the terminal-specific precoding antenna port rule is used.

A method for constituting the second control channel (a method for constituting the second control channel region and a method for configuring monitoring of the second control channel region) used by the base station 100 for the terminal 200 will be described hereinafter. In an example of the method, the configuration of the second control channel region and the configuration of transmission modes implicitly indicate the configuration of the monitoring of the second control channel. The base station 100 configures the second control channel by transmitting terminal-specific configuration information (RadioResourceConfigDedicated) regarding radio resources through control information (RRC signaling) in the higher layer. The terminal-specific configuration information regarding the radio resources is control information used for, for example, configuring, changing, or releasing the resource blocks or making terminal-specific configurations for the physical channels.

The base station 100 transmits the terminal-specific configuration information regarding the radio resources to the terminal 200. The terminal 200 makes terminal-specific configurations for the radio resources on the basis of the terminal-specific configuration information regarding the radio resources from the base station 100 and notifies the base station 100 of completion of the configuration of the terminal-specific configuration information regarding the radio resources.

The terminal-specific configuration information regarding the radio resources is constituted by including terminal-specific configuration information (PhysicalConfigDedicated) regarding the physical channels. The terminal-specific configuration information regarding the physical channels is control information that defines the terminal-specific configurations for the physical channels. The terminal-specific configuration information regarding the physical channels is constituted by including configuration information (CQI-ReportConfig) regarding channel state reports, terminal-specific configuration information (AntennaInforDedicated) regarding antenna information, and terminal-specific configuration information (EPDCCH-ConfigDedicated) regarding the second control channel. The configuration information regarding the channel state reports is used for defining configuration information for reporting the downlink channel state. The terminal-specific configuration information regarding the antenna information is used for defining terminal-specific antenna information in the base station 100. The terminal-specific configuration information regarding the second control channel is used for defining the terminal-specific configuration information regarding the second control channel. In addition, because the terminal-specific configuration information regarding the second control channel is transmitted and configured as control information specific to the terminal 200, the second control channel region configured is configured as a region specific to the terminal 200.

The configuration information regarding the channel state reports is constituted by including configuration information (cqi-ReportModeAperiodic) regarding aperiodic channel state reports and configuration information (CQI-ReportPeriodic) regarding periodic channel state reports. The configuration information regarding the aperiodic channel state reports is configuration information for aperiodically reporting a channel state in a downlink 103 through the physical uplink shared channels (PUSCHs). The configuration information regarding the periodic channel state reports is configuration information for periodically reporting the downlink channel state through the physical uplink control channels (PUCCHs).

The terminal-specific configuration information regarding the antenna information is constituted by including the transmission modes (transmissionMode). The transmission modes are information indicating transmission methods used by the base station 100 in the communication with the terminal 200. For example, the transmission modes are defined in advance as Transmission Mode 1 to 10. Transmission Mode 1 is a transmission mode in which a single-antenna-port transmission scheme that uses Antenna Port 0 is used. Transmission Mode 2 is a transmission mode in which transmission diversity scheme is used. Transmission Mode 3 is a transmission mode in which a cyclic delay diversity scheme is used. Transmission Mode 4 is a transmission mode in which a closed-loop spatial multiplexing scheme is used. Transmission Mode 5 is a transmission mode in which a multiuser MIMO scheme is used. Transmission Mode 6 is a transmission mode in which a closed-loop spatial multiplexing scheme that uses a single antenna port is used. Transmission Mode 7 is a transmission mode in which a single-antenna-port transmission scheme that uses Antenna Port 5 is used. Transmission Mode 8 is a transmission mode in which a closed-loop spatial multiplexing scheme that uses Antenna Ports 7 and 8 is used. Transmission Mode 9 is a transmission mode in which a closed-loop spatial multiplexing scheme that uses Antenna Ports 7 to 14 is used. In addition, Transmission Modes 1 to 9 are also referred to as first transmission modes.

Transmission Mode 10 is defined as a transmission mode different from Transmission Modes 1 to 9. For example, Transmission Mode 10 may be a transmission mode in which a CoMP scheme is used. Here, enhancement realized by introducing the CoMP scheme includes optimization of the channel state reports, improvement in accuracy (for example, introduction of precoding information and information regarding phase differences between base stations desirable during CoMP communication), and the like. Alternatively, Transmission Mode 10 may be a transmission mode in which a communication scheme obtained by enhancing (augmenting) the multiuser MIMO scheme that can be realized by the communication schemes described with reference to Transmission Modes 1 to 9 is used. Here, the enhancement of the multiuser MIMO scheme includes optimization of the channel state reports, improvement in accuracy (for example, introduction of CQI (channel quality indicator) information desirable during the multiuser MIMO communication), improvement in the orthogonality between terminals multiplexed in the same resources, and the like. Alternatively, Transmission Mode 10 may be a transmission mode in which the second control channel region can be configured. Alternatively, Transmission Mode 10 may be a transmission mode in which the CoMP scheme and/or the enhanced multiuser MIMO scheme are used in addition to all or part of the communication schemes described with reference to Transmission Modes 1 to 9. For example, Transmission Mode 10 may be a transmission mode in which the CoMP scheme and/or the enhanced multiuser MIMO scheme are used in addition to the communication scheme described with reference to Transmission Mode 9. Alternatively, Transmission Mode 10 may be a transmission mode in which a plurality of channel state information reference signals (CSI-RSs) can be configured. In addition, Transmission Mode 10 is also referred to as a second transmission mode.

It is to be noted that when transmitting data channels, the base station 100 can communicate with a terminal configured in Transmission Mode 10, in which a plurality of transmission schemes can be used, without notifying the terminal of which of the plurality of transmission schemes is used. That is, even if the terminal 200 has been configured in Transmission Mode 10, in which a plurality of transmission schemes can be used, the terminal 200 can communicate, when receiving the data channels, with the base station 100 without being notified of which of the plurality of transmission schemes is used.

Here, the second transmission mode is a transmission mode in which the second control channel can be configured. That is, if the base station 100 has configured the terminal 200 in the first transmission mode, the base station 100 maps the control channels intended for the terminal 200 in the first control channel region. On the other hand, if the base station 100 has configured the terminal 200 in the second transmission mode, the base station 100 maps the control channels intended for the terminal 200 in the first control channel region and/or the second control channel region. On the other hand, if the terminal 200 has been constituted by the base station 100 in the first transmission mode, the terminal 200 performs the blind decoding on the first control channels. On the other hand, if the terminal 200 has been constituted by the base station 100 in the second transmission mode, the terminal 200 performs the blind decoding on the first control channels and/or the second control channel.

In addition, the terminal 200 configures control channels to be subjected to the blind decoding regardless of the transmission mode on the basis of whether the base station 100 has configured the terminal-specific configuration information regarding the second control channel. That is, if the terminal-specific configuration information regarding the second control channel has not been configured for the terminal 200, the base station 100 maps the control channels intended for the terminal 200 in the first control channel region. On the other hand, if the terminal-specific configuration information regarding the second control channel has been configured for the terminal 200, the base station 100 maps the control channels intended for the terminal 200 in the first control channel region and/or the second control channel region. In addition, if the terminal-specific configuration information regarding the second control channel has been constituted by the base station 100, the terminal 200 performs the blind decoding on the first control channels and/or the second control channel. On the other hand, if the terminal-specific configuration information regarding the second control channel has not been constituted by the base station 100, the terminal 200 performs the blind decoding on the first control channels.

The terminal-specific configuration information regarding the second control channel is constituted by including subframe configuration information (EPDCCH-SubframeConfig-r11) regarding the second control channel. The subframe configuration information regarding the second control channel is used for defining subframe information for constituting the second control channel. The subframe configuration information regarding the second control channel is constituted by including a subframe configuration pattern (subframeConfigPattern-r11) and configuration information (epdcch-Config-r11) regarding the second control channel.

The subframe configuration pattern is information indicating subframes in which the second control channel is configured. For example, the subframe configuration pattern is n-bit information having a bitmap format. Information indicated by each bit indicates whether a subframe is configured as the second control channel. That is, the subframe configuration pattern may be configured in a period of n subframes. At this time, prescribed subframes in which synchronization signals, the broadcast channels, and the like are mapped can be excluded. More specifically, a remainder obtained by dividing the subframe number of each subframe by n corresponds to each bit of the subframe configuration pattern. For example, a value of 8, 40, or the like is predetermined as n. If information in the subframe configuration pattern regarding a prescribed subframe is "1", the subframe is configured as the second control channel. If information in the subframe configuration pattern regarding a prescribed subframe is "0", the subframe is not configured as the second control channel. In addition, it is possible to keep prescribed subframes in which the synchronization signals for the terminal 200 to synchronize with the base station 100, the broadcast channels for broadcasting the control information regarding the base station 100, and the like are mapped from being configured as the second control channel in advance. In addition, in another example of the subframe configuration pattern, a pattern of subframes configured as the second control channel is realized as indices in advance, and information indicating the indices is defined as the subframe configuration pattern.

The terminal-specific configuration information regarding the second control channel is constituted by including a resource allocation type (resourceAllocationType-r11) and resource assignment information (resourceBlockAssignment-r11).

The resource allocation type is information indicating the format (type) of information specifying resource blocks configured as the second control channel region in the subframes. In addition, the resource assignment information is information specifying resource blocks configured as the second control channel and defined on the basis of the format of the resource allocation type. It is to be noted that if a method for assigning resources is fixed in advance, the resource allocation type need not be transmitted.

For example, the resource assignment information may use a bitmap format that specifies a resource block configured as a second control channel region for each PRB. Each bit of the bitmap of the resource assignment information is associated with each RPB and indicates whether the PRB is configured as a second control channel region. For example, when the system bandwidth is constituted by N_RB RBs, the amount of information of the resource assignment information is N_RB bits. In addition, for example, the resource assignment information may be information indicating resource block numbers of the resource blocks configured as the second control channel region.

In addition, in another example, for example, a plurality of pieces of resource assignment information may be defined as Types 0 to 2 of the resource allocation type. The resource assignment information is control information for assigning resources to VRBs (virtual resource blocks). If the resource allocation type is Type 0, the resource assignment information is information having a bitmap format with which resources can be assigned for each resource block group defined in units of a plurality of consecutive VRBs. It is to be noted that the number of VRBs in a resource block group can be determined in accordance with the system bandwidth. If the resource allocation type is Type 1, the resource assignment information is information having a bitmap format with which, among a plurality of resource block group subsets to which the VRBs in the resource block groups belong, resources can be assigned to each VRB in the plurality of resource block group subsets. In addition, the resource assignment information includes information indicating a selected resource block group subset. If the resource allocation type is Type 1, the resource assignment information is information indicating one of the consecutive VRBs at which the assignment begins and information indicating the number of VRBs assigned. Alternatively, the resource assignment information may have a bitmap format in which each VRB corresponds to 1 bit.

Here, the number of VRBs is the same as the number of PRBs. In addition, a plurality of types of VRBs are defined. Mapping of the VRBs in the PRBs (PRB mapping) is defined in accordance with these types. In a localized type, the mapping is performed such that VRB numbers (positions of the VRBs) and PRB numbers (numbers of PRBs) become the same. Here, the PRB numbers are sequentially given from PRBs of lower frequencies. In addition, in a distributed type, the mapping is performed using a predetermined method such that the VRB numbers are distributed (randomized) among the PRB numbers. In the distributed type, hopping may be performed between the slots, that is, a second slot of each VRB can be subjected to the hopping to a different VRB. In addition, whether to perform the hopping on the second slots may be transmitted through the RRC signaling or PDCCH signaling and switched, or may be predetermined. A case will be described hereinafter in which it is predetermined that the hopping is not performed on the second slots.

In addition, if the resource allocation type is Type 0 or Type 1, the PRB mapping is invariably of the localized type. If the resource allocation type is Type 2, the PRB mapping may be of the localized type or the distributed type. The resource allocation types included in the configuration information regarding the second control channel also include control information (PRB mapping information) regarding the PRB mapping. For example, the resource allocation type may be control information indicating one of Type 0, Type 1, Type 2 Localized, and Type 2 Distributed.

In addition, the terminal-specific configuration information regarding the second control channel is constituted by including information indicating a method for mapping the logical resources and the physical resources in the second control channel region. For example, information indicating one of the distributed mapping method and the localized mapping method illustrated in FIGS. 5 and 6, respectively, is included. In addition, the terminal-specific configuration information regarding the second control channel is constituted by including information indicating association between the resources (E-REGs, E-CCEs, or an E-PDCCH) constituting the RBs and the antenna ports for the terminal-specific reference signals. For example, the information indicating the association between the resources and the antenna ports for the terminal-specific reference signals indicates that the antenna ports for the terminal-specific reference signals for demodulating the resources constituting the RBs are shared between the RBs. In addition, the information indicating the association between the resources and the antenna ports for the terminal-specific reference signals indicates that a different antenna port for the terminal-specific reference signals is used for each resource constituting the RBs. In addition, the terminal-specific configuration information regarding the second control channel may include information indicating the antenna ports for the terminal-specific reference signals corresponding to the resources (E-REGs, E-CCEs, or an E-PDCCH) constituting the RBs. In addition, the terminal-specific configuration information regarding the second control channel is As described above, when the base station 100 configures the second control channel for the terminal 200, the base station 100 transmits the terminal-specific configuration information regarding the radio resources while including the terminal-specific configuration information regarding the second control channel in the terminal-specific configuration information regarding the radio resources through the RRC signaling. In addition, similarly, when the base station 100 changes the configured second control channel for the terminal 200, the base station 100 transmits, through the RRC signaling, the terminal-specific configuration information regarding the radio resources including the terminal-specific configuration information regarding the second control channel whose parameters have been changed. In addition, similarly, when the base station 100 releases the configured second control channel for the terminal 200, the base station 100 notifies the terminal 200 of the release through the RRC signaling. For example, the base station 100 transmits the terminal-specific configuration information regarding the radio resources that does not include the terminal-specific configuration information regarding the second control channel. Alternatively, the base station 100 may transmit control information for releasing the terminal-specific configuration information regarding the second control channel.

It is to be noted that although the resource elements and the resource blocks are used as the units of the mapping of the data channels, the control channels, the PDSCHs, the PDCCHs, and the reference signals and the subframes and radio frames are used as the units of transmission in the time direction in the above embodiment, the units used are not limited to these. The same advantageous effects can be produced even if a region constituted by any frequency and time and time units are used instead of these.

In addition, although the enhanced physical downlink control channels 103 arranged in PDSCH region are referred to as the E-PDCCH and clearly distinguished from the existing physical downlink control channels (PDCCHs) in the above embodiment, the enhanced physical downlink control channels are not limited to this. Even when the two physical downlink control channels are both referred to as PDCCHs, the essence is the same as in the above embodiment, in which the E-PDCCH and the PDCCHs are distinguished from each other, insofar as the enhanced physical downlink control channels arranged in the PDSCH region and the existing physical downlink control channels arranged in a PDCCH region operate differently.

It is to be noted that, by transmitting information (terminal capability information or function group information) indicating whether the functions described in the above embodiment can be used to the base station when the terminal begins communication with the base station, the base station can determine whether the functions described in the above embodiment can be used. More specifically, if the functions described in the above embodiment can be used, information indicating that in the terminal capability information, and if the functions described in the above embodiment cannot be used, the information regarding the functions is not included in the terminal capability information. Alternatively, if the functions described in the above embodiment can be used, a prescribed bit field of the function group information may have a value of 1, and if the functions described in the above embodiment cannot be used, the prescribed bit field of the function group information may have a value of 0.

It is to be noted that although the resource elements and the resource blocks are used as the units of the mapping of the data channels, the control channels, the PDSCHs, the PDCCHs, and the reference signals and the subframes and the radio frames are used as the units of the transmission in the time direction in the above embodiment, the units used are not limited to these. The same advantageous effects can be produced even if a region constituted by any frequency and time and time units are used instead of these. It is to be noted that although a case in which demodulation is performed using the RSs subjected to the precoding process has been described and ports equivalent to a MIMO layer have been described as ports corresponding to the RSs subjected to the precoding process in the above embodiment, the RSs and the ports used are not limited to these. The same advantageous effects can be produced in other cases by applying the present invention to ports corresponding to different reference signals. For example, unprecoded RSs may be used instead of the precoded RSs, and ports equivalent to output ends after the precoding process or ports equivalent to physical antennas (or a combination of physical antennas) may be used as the ports.

Programs that operate on the base station 100 and the terminal 200 in the present invention are programs (programs for causing computers to function) for controlling CPUs or the like in such a way as to realize the functions of the embodiment of the present invention. In addition, information handled by these apparatuses is temporarily accumulated in RAMS during processing, and then stored in various ROMs or HDDs and read, corrected, or written by the CPUs as necessary. Recoding media storing the programs may be semiconductor media (for example, ROMs, nonvolatile memory cards, or the like), optical recording media (for example, DVDs, MOs, MDs, CDs, BDs, or the like), magnetic recording media (for example, magnetic tapes, flexible disks, or the like), or the like. In addition, the functions of the above-described embodiment may be realized not only by executing the loaded programs but also by performing processing in combination with operating systems, other application programs, or the like on the basis of instructions from the programs.

In addition, when the programs are to be distributed to the market, the programs may be stored in portable recording media and distributed or transferred to a server computer connected through a network such as the Internet. In this case, a storage device of the server computer is also included in the present invention. Alternatively, part or all of the base station 100 and the terminal 200 in the above-described embodiment may be realized as LSI, which is typically integrated circuits. Each function block of the base station 100 and the terminal 200 may be individually realized as a chip, or part or all of the function blocks may be integrated and realized as a chip. In addition, a method for realizing the function blocks as integrated circuits is not limited to the LSI, but may be realized by general-purpose processors. In addition, if a technology for realizing the function blocks as integrated circuits that replaces the LSI has been developed as a result of the evolution of semiconductor technologies, integrated circuits realized by the technology may be used.

Although the embodiment of the present invention has been described in detail with reference to the drawings, specific configurations are not limited to those described in the embodiment, and design changes and the like that do not deviate from the scope of the present invention are also included. In addition, the present invention may be modified in various ways within the range defined by the claims, and embodiments obtained by appropriately combining technical means disclosed in different embodiments are also included in the technical scope of the present invention. In addition, configurations obtained by replacing elements that have been described in the embodiment and that produce the same advantageous effects are also included.

INDUSTRIAL APPLICABILITY

The present invention can be desirably used in a radio base station apparatus, a radio terminal apparatus, a radio communication system, and a radio communication method.

REFERENCE SIGNS LIST 100 base station
101, 206 higher layer
102 data channel generation unit
103 second control channel generation unit
104 terminal-specific reference signal multiplexing unit
105 precoding unit
106 first control channel generation unit
107 cell-specific reference signal multiplexing unit
108 transmission signal generation unit
109 transmission unit
200, 1104 terminal
201 reception unit
202 reception signal processing unit
203 channel estimation unit
204 control channel processing unit
205 data channel processing unit
801 to 804 control channel
1101 macro base station
1102, 1103 RRH
1108, 1109 line
1105, 1106, 1107 coverage

The invention claimed is:

1. A base station apparatus that is configured to and/or programmed to communicate with a terminal apparatus, the base station apparatus comprising:
a transmitter configured to and/or programmed to transmit an Enhanced Physical Downlink Control CHannel (EPDCCH) in an EPDCCH region, wherein
physical resource block pairs corresponding to the EPDCCH region are indicated by higher layers,
the EPDCCH is transmitted using one or a plurality of enhanced control channel elements,
the enhanced control channel element consists of a plurality of enhanced resource element groups in one physical resource block pair in a case that the enhanced control channel element is subject to a localized mapping,
the enhanced control channel element consists of a plurality of enhanced resource element groups in a plurality of physical resource block pairs in a case that the enhanced control channel element is subject to a distributed mapping,
in a case of the localized mapping, an EPDCCH UE-specific search space monitored by the terminal apparatus at an aggregation level is defined by a plurality of EPDCCH candidates, n-th EPDCCH candidate and (n+1)-th EPDCCH candidate in the plurality of EPDCCH candidates correspond to enhanced control channel elements in different physical resource block pairs, and
a relationship between a number assigned to each EPDCCH candidate and a number assigned to each enhanced control channel element does not vary regardless of whether the enhanced control channel element is subject to the localized mapping or the distributed mapping.

2. The base station apparatus according to claim 1, wherein
the number of the plurality of EPDCCH candidates at the aggregation level is smaller than or equal to the number of the physical resource block pairs corresponding to the EPDCCH region.

3. The base station apparatus according to claim 1, wherein
a value obtained by dividing the number of the enhanced control channel elements in the EPDCCH region by the number of the plurality of EPDCCH candidates at the aggregation level is larger than or equal to the number of the enhanced resource element groups per the enhanced control channel element.

4. The base station apparatus according to claim 1, wherein
one or a plurality of the enhanced control channel elements corresponding to each EPDCCH candidate in the plurality of EPDCCH candidates are comprised in one physical resource block pair.

5. A terminal apparatus that is configured to and/or programmed to communicate with a base station apparatus, the terminal apparatus comprising:
a receiver configured to and/or programmed to monitor an Enhanced Physical Downlink Control CHannel (EPDCCH) UE-specific search space in an EPDCCH region, wherein
physical resource block pairs corresponding to the EPDCCH region are indicated by higher layers,
an EPDCCH is transmitted using one or a plurality of enhanced control channel elements in the EPDCCH UE-specific search space,
the enhanced control channel element consists of a plurality of enhanced resource element groups in one physical resource block pair in a case that the enhanced control channel element is subject to a localized mapping,
the enhanced control channel element consists of a plurality of enhanced resource element groups in a plurality of physical resource block pairs in a case that the enhanced control channel element is subject to a distributed mapping,
in a case of the localized mapping, the EPDCCH UE-specific search space monitored by the terminal apparatus at an aggregation level is defined by a plurality of EPDCCH candidates, n-th EPDCCH candidate and (n+1)-th EPDCCH candidate in the plurality of EPDCCH candidates correspond to enhanced control channel elements in different physical resource block pair pairs, and
a relationship between a number assigned to each EPDCCH candidate and a number assigned to each enhanced control channel element does not vary regardless of whether the enhanced control channel element is subject to the localized mapping or the distributed mapping.

6. The terminal apparatus according to claim 5, wherein the number of the plurality of EPDCCH candidates at the aggregation level is smaller than or equal to the number of the physical resource block pairs corresponding to the EPDCCH region.

7. The terminal apparatus according to claim 5, wherein a value obtained by dividing the number of the enhanced control channel elements in the EPDCCH region by the number of the plurality of EPDCCH candidates at the aggregation level is larger than or equal to the number of the enhanced resource element groups per the enhanced control channel element.

8. The terminal apparatus according to claim 5, wherein one or a plurality of the enhanced control channel elements corresponding to each EPDCCH candidate in the plurality of EPDCCH candidates are comprised in one physical resource block pair.

9. A communication method used by a base station apparatus that is configured to and/or programmed to communicate with a terminal apparatus, the communication method comprising:
transmitting an Enhanced Physical Downlink Control CHannel (EPDCCH) in an EPDCCH region, wherein
physical resource block pairs corresponding to the EPDCCH region are indicated by higher layers,
the EPDCCH is transmitted using one or a plurality of enhanced control channel elements,
the enhanced control channel element consists of a plurality of enhanced resource element groups in one physical resource block pair in a case that the enhanced control channel element is subject to a localized mapping,
the enhanced control channel element consists of a plurality of enhanced resource element groups in a plurality of physical resource block pairs in a case that the enhanced control channel element is subject to a distributed mapping,
in a case of the localized mapping, an EPDCCH UE-specific search space monitored by the terminal apparatus at an aggregation level is defined by a plurality of EPDCCH candidates, n-th EPDCCH candidate and (n+1)-th EPDCCH candidate in the plurality of EPDCCH candidates correspond to enhanced control channel elements in different physical resource block pair pairs, and
a relationship between a number assigned to each EPDCCH candidate and a number assigned to each enhanced control channel element does not vary regardless of whether the enhanced control channel element is subject to the localized mapping or the distributed mapping.

10. The communication method according to claim 9, wherein
the number of the plurality of EPDCCH candidates at the aggregation level is smaller than or equal to the number of the physical resource block pairs corresponding to the EPDCCH region.

11. A communication method used by a terminal apparatus that is configured to and/or programmed to communicate with a base station apparatus, the communication method comprising:
monitoring an Enhanced Physical Downlink Control CHannel (EPDCCH) UE-specific search space in an EPDCCH region, wherein
physical resource block pairs corresponding to the EPDCCH region are indicated by higher layers,
an EPDCCH is transmitted using one or a plurality of enhanced control channel elements in the EPDCCH UE-specific search space,
the enhanced control channel element consists of a plurality of enhanced resource element groups in one physical resource block pair in a case that the enhanced control channel element is subject to a localized mapping,
the enhanced control channel element consists of a plurality of enhanced resource element groups in a plurality of physical resource block pairs in a case that the enhanced control channel element is subject to a distributed mapping,
in a case of the localized mapping, the EPDCCH UE-specific search space monitored by the terminal apparatus at an aggregation level is defined by a plurality of EPDCCH candidates, n-th EPDCCH candidate and (n+1)-th EPDCCH candidate in the plurality of EPDCCH candidates correspond to enhanced control channel elements in a-different physical resource block pairs, and
a relationship between a number assigned to each EPDCCH candidate and a number assigned to each enhanced control channel element does not vary regardless of whether the enhanced control channel element is subject to the localized mapping or the distributed mapping.

12. The communication method according to claim 11, wherein the number of the plurality of EPDCCH candidates at the aggregation level is smaller than or equal to the number of the physical resource block pairs corresponding to the EPDCCH region.

\* \* \* \* \*

UNITED STATES PATENT AND TRADEMARK OFFICE
CERTIFICATE OF CORRECTION

PATENT NO.       : 9,510,337 B2  
APPLICATION NO.  : 14/385008  
DATED            : November 29, 2016  
INVENTOR(S)      : Kazuyuki Shimezawa et al.

Page 1 of 1

It is certified that error appears in the above-identified patent and that said Letters Patent is hereby corrected as shown below:

On the Title Page

Item (72), Inventors, change "Kazuyuki Shimezawa, Osaka (JO)" to --Kazuyuki Shimezawa, Osaka (JP)--.

Signed and Sealed this  
Second Day of May, 2017

Michelle K. Lee  
*Director of the United States Patent and Trademark Office*